United States Patent [19]

Hall

[11] Patent Number: 5,930,479
[45] Date of Patent: Jul. 27, 1999

[54] COMMUNICATIONS ADDRESSING SYSTEM

[75] Inventor: Robert J. Hall, Berkeley Heights, N.J.

[73] Assignee: AT&T Corp, Middletown, N.J.

[21] Appl. No.: 08/734,285

[22] Filed: Oct. 21, 1996

[51] Int. Cl.$^6$ ................................................. G06F 17/00
[52] U.S. Cl. ............................... 395/200.68; 395/200.36
[58] Field of Search .......................... 395/200.68, 200.7, 395/200.55, 200.36; 380/23, 24, 25

[56] References Cited

U.S. PATENT DOCUMENTS

| | | | |
|---|---|---|---|
| 5,717,860 | 2/1998 | Graber et al. ....................... | 395/200.63 |
| 5,742,771 | 4/1998 | Fontaine ............................. | 395/200.55 |

OTHER PUBLICATIONS

S. Kent, RFC 1422, "Privacy Enhancement for Internet Electronic Mail: Part II: Certificate–Based Key Management," Internet Engineering Task Force, Feb. 1, 1993, pp. 1–32.

Blum et al.: A Simple Unpredictable Pseudo–Random Number Generator, SIAM Journal of Computing, vol. 15 No. 2 p. 364 (May 1986).

Borenstein & Thyberg: Power, ease of use and cooperative work in a practical multimedia message system, Int'l J. Man–Machine Studies 34 (1) 229–259 (1991).

Dusse: S/MIME Message Specification, RSA Data Security Inc. (Sep. 1996).

Dusse and Matthews: S/MIME: Anatomy of a Secure E–mail Standard, RSA Data Security Inc., printed from http://www.ema.org/html/pubs/mmv2n4/s–mime.htm on Oct. 18, 1996, original publication date unknown.

Myers & Rose: Request for Comments 1725, Post Office Protocol—Version 3. University of California at Berkeley. http://cobweb.berkeley.edu/Web/Hyypertext/Popper/rfc1725.txt (Nov. 1994).

RSA Data Security, Inc.: S/MIME Implementation Guide, Interoperability Profile, Version 1, S/MIME Editor. ftp://ftp.rsa.com/pub/S–MIME/smimeimp.txt (Aug. 1995).

RSA Data Security, Inc.: S/MIME Central. Retrieved from the web, http://www.rsa.com/rsa/S–MIME on Oct. 18, 1996; orignal publication date unknown.

Schiller: MIT distribution site for PGP, http://web.mit.edu/network/pgp.html (Sep. 4, 1996).

University of California at Berkeley: popper–1.831 beta README file, http://avalon.phys.hokudai.ac.jp/pub/hp . . . –1.831beta/popper–1.831beta.README.html (1991).

University of California at Berkeley: popper Maintenance Procedures http://ptolemy.eecs.berkeley.educ/cgi–bin/man-?popper (Aug. 1990).

*Primary Examiner*—Ellis B. Ramirez

[57] ABSTRACT

A system and method is provided for sending and receiving authorized messages from a sender to a recipient in a network. The method and system makes use of a channelized address to send the message from the sender to the recipient. The channelized address comprises a common address portion that indicates the identity of the recipient in the network and a channel identifier portion for verifying that the message is authorized for delivery to the recipient.

68 Claims, 11 Drawing Sheets

FIG. 1A
(PRIOR ART)

frobboz@geewhiz.com

- 100: frobboz
- 104: @
- 102: geewhiz.com

FIG. 1B frobboz-1G77IG9AQ9-@geewhiz.com

- 116, 114
- 108: frobboz
- 110: 1G77IG9AQ9
- 104: @
- 112: geewhiz.com
- 106

FIG. 4

| CORRESPONDENT ADDRESS | OWN CHANNEL | CORRESPONDENT CHANNEL | OWN KEY | CORRESPONDENT KEY |
|---|---|---|---|---|
| frobboz@geewhiz.com | 1QXR7112PH | 1DDYWA7H7I | X9GWAAH4T | T7AA18MMN |
| jrandom@j.r.isp.net | 122PG3LWAW | 1CJX449HKV | ADWKBSA92 | ---------- |
| ---------- | 2AA47WX3BQ | ---------- | ---------- | ---------- |
| ---------- | 2BZZ86A9FC | ---------- | ---------- | ---------- |
| info-hooha@sri.com | 0XTRR9Y6B0 | ---------- | BZTGRTKI3 | ---------- |

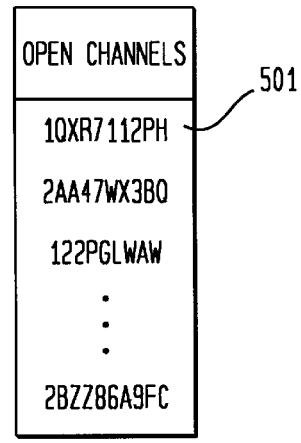

OPEN CHANNELS
- 1QXR7112PH — 501
- 2AA47WX3BQ
- 122PGLWAW
- ⋮
- 2BZZ86A9FC

FIG. 8A

802 — FROM: hall@research.att.com
803 — TO: frobboz@geewhiz.com
804 — Cc: jrandom@j.r.isp.net 805 {
CHUCK,
HAVE YOU HEARD FROM foo@bar.com
LATELY?
--BOB
}

FIG. 8B

802a — FROM: hall-1B8SYC8YNL-@research.att.com (810)
803a — TO: frobboz-1G77IG9AQ9-@geewhiz.com
804a — Cc: jrandom@j.r.isp.net  812

805a {
CHUCK,
HAVE YOU HEARD FROM foo@bar.com
LATELY?
--BOB
}

FIG. 10A

TO: frobboz-1DDYWA7H7I-@geewhiz.com
FROM: someone-10XR7112PH-@domain.com
----------------------
SEND YOUR KEY  X9GWAAH4T
   1001              1002

FIG. 10B

TO: someone-10XR7112PH-@domain.com
FROM: frobboz-1DDYWA7H7I-@geewhiz.com
----------------------
MY KEY IS: T7AA18MMN
   1004
                X9GWAAH4T
                   1006

FIG. 10C

TO: frobboz-1DDYWA7H7I-@geewhiz.com
FROM: someone-1QXR7112PH-@domain.com
- - - - - - - - - - - - - - - - - - - - -
CHANGE TO CHANNEL 1L3RG3592T
    1008                T7AA18MMN
                        X9GWAAH4T — 1010
                            — 1006

FIG. 10D

TO: Someone-1QXR7112PH-@domain.com
FROM: frobboz-1DDYWA7H7I-@geewhiz.com
- - - - - - - - - - - - - - - - - - - - -
ACKNOWLEDGE THE CHANGE TO CHANNEL 1L3RG3592T
    1011        X9GWAAH4T                — 1012
                T7AA18MMN — 1006
                    — 1010

FIG. 10E

1016
TO: someone-1L3RG3592T-@domain.com
FROM: frobboz-1DDYWA7H7I-@geewhiz.com
- - - - - - - - - - - - - - - - - - - - -
DEAR TIM:
    HOW IS THE PROJECT PROGRESSING? PLEASE LET ME
KNOW AT YOUR EARLIEST CONVENIENCE.
                JOAN

COMMUNICATIONS ADDRESSING SYSTEM

BACKGROUND OF THE INVENTION

1. Field of the Invention

The present invention relates generally to communications sent over a communication network, and more particularly, to a system and method for controlling the reception of communications from various entities having access to the network.

2. Description of the Related Art

Electronic mail ("e-mail") has become increasingly popular as a form of communication in today's society. This is true at least in part due to the popularity of the Internet. Users of e-mail may be referred to as "users". The user is generally referred to as a "recipient" when receiving e-mail and as a "sender" when sending e-mail to a recipient. The term "correspondent" may be used to refer to a person or persons who are sending e-mail to, or receiving e-mail from, the user in question.

To send e-mail over a communications network, a user must address an e-mail message to an intended recipient. For example, referring to FIG. 1A, a conventional e-mail address as used on the Internet is illustrated. The address usually has two parts, the user name 100 (also referred to as the "mailbox name") and the host (or domain) name 102. These two parts are part of a hierarchy of names; that is, the domain name 102 is of a higher level than the user name 100. The user name 100 may be described as the lowest-level name in the hierarchy. Typically, the user name 100 and the host name 102 may be separated by an "at" sign, "@", 104. To send e-mail over the Internet, the user addresses the e-mail message by placing the intended recipients' addresses in the "To" line (or field) of the message as is well know in the art. In addition, a user may "carbon copy" or "cc" (or "Cc") yet another intended recipient of the e-mail message by placing that recipient's address in the cc line (or field) as is also well known in the art. There is also typically a "from" line (or field) indicating who sent the message. All of these items together with other lines such as subject, date, etc., form what is known as a "header" of the e-mail message. Other options, also well known in the art, are available for various ways to address intended recipients of Internet e-mail. Analogous methods exist for addressing e-mail over other networks.

Unfortunately, as with other forms of communication, for example regular mail and facsimile, users of e-mail may receive a quantity of unwanted or "junk" mail. This may be in the form of "telemarketing" type e-mail (for example an advertisement or a survey). While this may only rise to the level of a mere nuisance or annoyance, in some situations, unwanted e-mail may actually rise to the level of harassment. For example, the user may receive unwanted offensive or obscene e-mail. A malicious e-mail sender could also possibly send "hate mail".

This type of activity, in some circumstances, may as a practical matter render the user's e-mail capabilities useless. For example, if a malicious e-mail sender barraged the e-mail user's mail box with a multitude of messages that the user would have to review, any wanted, or "non-junk" mail would be buried in a large amount of useless junk e-mail. The malicious e-mail sender could also send messages that were known to offend the recipient so that the recipient would not want to review any of the messages received, including legitimate messages.

The commercialization of the Internet further threatens the usefulness of e-mail. Today, it is easier than in the past to collect address lists and inexpensive to mass-distribute messages. Every time a user sends a message to a public newsgroup or list, fills out a web form, or mails in a product registration card, the server inexpensively obtains an e-mail address and typically some indication of the user's interests. This information can then be sold to marketing firms who can easily automate unsolicited mass e-mailings of advertisements, surveys, and other annoyances that may cost the user connect time and, possibly worse, valuable attention span.

It would be desirable to be capable of restricting the receipt of unwanted e-mail and other types of messages sent over a network. In addition, when unwanted e-mail (or messages) is received, it would be beneficial to be able to determine in what manner the sender of the unwanted e-mail obtained the user's address.

One way to restrict unwanted e-mail is for the user to limit who he gives his e-mail address to. This is analogous to having an unlisted telephone number. Alternatively, a user might maintain multiple e-mail accounts, using different accounts for different purposes, such as one address for business purposes and another address for personal purposes. This "unlisted address" approach may be expensive and slow to recover from security breaches. For example, if an address that was supposed to be kept secret is leaked to a malicious e-mail sender (also referred to as an "adversary"), the "secret" address is no longer secret. The only way to stop this leak may be to pay a fee to the service provider to change the address. This may be a lengthy process and, once the address is changed, the user must attempt to notify all legitimate correspondents of the change while keeping it from the adversary.

Another approach to solving these problems is through the use of "kill files". This is accomplished by simply discarding all messages from a predetermined user, site, or even domain. Killing a site or domain prohibits messages from all of its users, even though only a subset may be undesirable. Undesirables can have other accounts with completely different addresses, or may forge messages in order to evade simple address checks such as these.

In addition to kill files, another prior art approach is to use an e-mail filter to discard undesired messages. This would include messages that do not satisfy user-defined criteria. A filter works by searching for syntactic patterns and eliminating (or filtering) messages that match. However, it is extremely difficult to define syntactic rules that can reliably distinguish advertisements and surveys from legitimate messages. For example, if the following message were received from an individual, a filter may assume that it is a legitimate question from a friend and fail to filter it out:

"Dear Bob, I have difficulty using software package X. It never seems to run in a multitasking environment! Isn't this frustrating? Do you have the same problem? Maybe you should check out software package Y which will eliminate the problem. Talk to you soon, John"

This message, upon an initial review, appears to be a legitimate question and suggestion sent to "Bob". This could also represent a ploy by "John" to advertise a software package Y. It would be extremely difficult to write an e-mail filter that discards this message but lets through legitimate messages.

Another prior art method of restricting access to e-mail is cryptographic authentication. With this method, access is controlled by requiring all messages to be digitally signed by an authorized correspondent. A cryptographic filter would discard any unsigned or unauthorized messages. This approach may provide protection against unauthorized messages. However, even though software packages exist to do the cryptographic operations necessary (for example PGP ["pretty good privacy"] available over the Internet from the Massachusetts Institute of Technology [see the World Wide Web Page located at http://web.mit.edu/network/pgp.html] or products that comply with S/MIME, which is a specification for secure e-mail [information about S/MIME may be obtained on the World Wide Web page "S/MIME Central" at http://www.rsa.com/rsa/S-MIME/]), reliably obtaining a public key of a correspondent is still problematic in that the public key transfer itself must also be digitally signed, which requires reliably knowing the signing key for that message. In addition, this method does not solve the problem of allowing messages from previously unknown correspondents, such as messages received from mailing lists. If the user wishes to be able to receive such messages, he must publish a single address. Even if a message to that address is digitally signed with a certified key, there is no guarantee that the message is not junk.

Yet another alternative is to accumulate a list of individuals who send junk e-mail, but adversaries may be able to evade this mechanism by registering several addresses and keys, or by having a different employee send each message.

There are also existing methods of augmenting the user name portion of an e-mail address. For example, the Andrew Message System, as described in Nathaniel S. Borenstein and Chris A. Thyberg, Power, ease of use and cooperative work in a practical multimedia message system, International Journal of Man-Machine Studies, Volume 34, Number 2, pages 229–259, February 1991, uses addresses of the form "user+info@host". Each user may write code in the Andrew Message System FLAMES language to process messages based on the content of the "info" field. For example, "urgent" may be placed in the info field indicating that incoming messages are urgent. With this system, it is up to the good will of the correspondent to not purposefully mischaracterize messages, for example by sending junk mail while using "urgent" in the "info" field. The "info" field is typically well-known, predictable or easily guessable.

Therefore, there is a need for an effective way of preventing undesirable e-mail and other network communications or messages. There is also a need for the ability to trace unwanted or undesirable e-mail (and communications or messages).

SUMMARY OF THE INVENTION

The above mentioned shortcomings are overcome and a technical advance is made over the prior art through the system and method of the present invention. In a first aspect, the invention features a method for sending a message from a sender to a recipient in a network. The method comprises the step of using an address to send the message from the sender to the recipient. The address comprises a common address portion that indicates an identity of the recipient in the network and a channel identifier portion for verifying that the message is authorized for delivery to the recipient.

In another aspect of the invention, an improved address of the type having a hierarchy of names including a lowest-level name at the lowest level of the hierarchy is provided. The improved address comprises a channel identifier part of the lowest-level name that includes at least a substantially unguessable channel identifier.

In another aspect of the invention, a system for authenticating a received message from a network is provided. The system comprises a mail server for receiving and authenticating the message. A file is available to the mail server for determining whether the message is an authorized message. This determination is based upon a substantially unguessable portion of the address attached to the message.

In another aspect of the invention, a system is provided for sending a message on a network to a recipient. The system comprises a personal channel agent for automatically including a substantially unguessable portion in a recipient's address so that the recipient can determine whether the message is an authorized message that the recipient will receive.

In another aspect of the invention, a method of sending and receiving messages from one or more first correspondents to a second correspondent is provided. The method comprises the steps of: (1) the second correspondent forming a plurality of substantially unguessable extended addresses for messages sent from the first correspondent to the second correspondent; and (2) providing a received message to the second correspondent only if an address to the second correspondent associated with the received message matches one of the plurality of extended addresses.

BRIEF DESCRIPTION OF THE DRAWINGS

The foregoing features and other aspects of the invention are explained in the following description taken in connection with the accompanying drawings, in which like reference characters refer to like parts throughout, and wherein:

FIG. 1A is a diagram of a conventional e-mail address;

FIG. 1B is a diagram of a channelized address according to an embodiment of the present invention;

FIG. 4 is a diagram illustrating a database used in connection with the system shown in FIG. 2;

FIG. 5 is a diagram illustrating a file used in connection with the system shown in FIG. 2;

FIG. 8A is a diagram illustrating an e-mail message according to an embodiment of the present invention;

FIG. 8B is a diagram illustrating an e-mail message according to an embodiment of the present invention.

FIG. 10A is a diagram illustrating a message according to an embodiment of the present invention;

FIG. 10B is a diagram illustrating a message according to an embodiment of the present invention;

FIG. 10C is a diagram illustrating a message according to an embodiment of the present invention FIG. 10D is a diagram illustrating a message according to an embodiment of the present invention;

FIG. 10E is a diagram illustrating a message according to an embodiment of the present invention;

DETAILED DESCRIPTION

Figure 2:
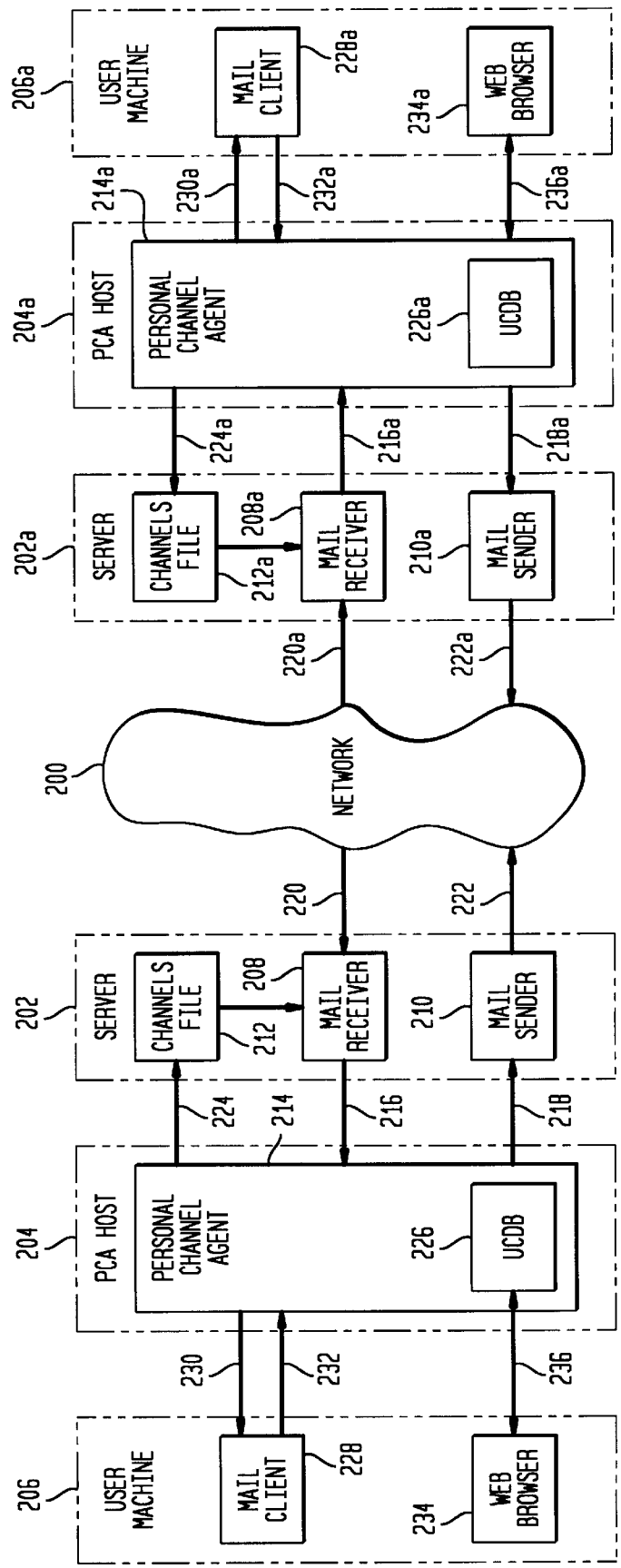
FIG. 2 is a block diagram illustrating a system configured according to an embodiment the present invention.

A preferred embodiment of the present invention utilizes "channelized addresses" to allow correspondents to send and receive e-mail. Channelized addresses create different "channels" that correspondents can use to send e-mail to the user. In other words, each user's e-mail account is made accessible via a user-controlled set of channels. Each channel has a distinct structured e-mail address that contains within it the account name and a cryptographically unpredictable or "unguessable" random string, known as a "channel identifier." Each legitimate correspondent is allowed to know one or more of these access addresses or channel identifiers.

The system according to the invention allows the user to reject any e-mail not arriving on a proper channel (with a proper channelized address). If unwanted e-mail does arrive on a valid channel, the user may turn the channel off and allow legitimate users of that channel to use another channel. In other words, legitimate users are "switched" to another channel.

The user (or account owner) is provided simple controls for opening a new channel, closing a channel (hence possibly retracting one or more correspondent's access privilege), and switching a channel (notifying selected correspondents that the current channel is being closed, but a new one is open for their use). This can be provided through an automated personal channel agent ("PCA"). The PCA also causes the received channelized e-mail to look and feel to the user exactly like conventional e-mail. The PCA provides various administrative controls. The PCA manages a database that maps a correspondent's address to its assigned channel, as well as (when applicable) the channel assigned by the correspondent to the account owner.

Referring to FIG. 1B, a "channelized address" 106 according to a preferred embodiment is shown. This address is in the standard Internet domain name format. This format usually consists of a hierarchy of names, the domain name being of a higher level and the user name being of a lower level in the hierarchy. It should be understood that other known address formats can also be used. Indeed, virtually any address format that has a user name part may be used.

The channelized address 106 in FIG. 1B comprises at least three basic parts, the user name 108, the channel identifier (or channel ID) 110, and the host (or domain) name 112. Between the channel ID 110 and the host name 112 is an "at" sign, "@", 104. As shown in FIG. 1B, there is a hyphen ("-") immediately before and immediately after the channel ID 110. By comparison of FIG. 1A with FIG. 1B, it should be noticed that the prior art address (FIG. 1A) is somewhat similar in appearance to the channelized address of the preferred embodiment (FIG. 1B), except that the channelized address of the preferred embodiment contains the channel ID 110 to the left of the "at" sign 104. Thus, the channelized address 106 contains both traditional address information (e.g., user name 108 and host name 112), as well as the channel ID 110.

In a preferred embodiment, the administration of the channelized addresses 106 and the generation of the channel ID 110 are accomplished by a personal channel agent (or administrator) ("PCA"), which is described below in more detail with respect to other functions it performs.

Each channel identifier 110 comprises at least two parts, a security string 114 and a channel class indicator 116. The channel class indicator 116 is an ASCII code for a digit indicative of a channel class. In a preferred embodiment, the security string 114 causes the channel identifier 110 to be practically unguessable (or even random), even when a malicious e-mail sender (or adversary) is aware of several of the user's other preexisting channel identifiers. That is, the channel identifier 110 should be unpredictable by an adversary. The security string 114 may be generated pseudorandomly. In alternate embodiments, the security string 114 may be generated randomly or selected by a user. Again, the important point is that the security string 114 be practically unguessable by an adversary, no matter how it is generated.

One method to generate random bits to be used in the security string 114 in a preferred embodiment is using the cryptographically unpredictable generator of Blum Blum and Shub ("BBS generator"), with a modulus size larger than 1024 bits (for example 1046 bits may be used in one embodiment). This method is disclosed in L. Blum, M. Blum, & M. Shub, A Simple Unpredictable Pseudo-Random Number Generator, Society for Industrial and Applied Mathematics Journal on Computing, Volume 15, No. 2, pages 364–383, May 1986, which is hereby incorporated by reference herein. Once the random bits are generated, they cannot simply be inserted into an e-mail address because typical e-mail protocols, including the Internet mail protocol, restrict the set of characters allowed in an address. Thus, to generate the security string 114 of a new channel ID 110, the system preferably first generates 45 random bits using the BBS generator method. These bits are then encoded into strictly alphanumeric ASCII characters 5 bits at a time, using only one case of the alphabet and the digits 3 through 8. (For example, in one embodiment, binary numbers 00000–11001 are mapped to uppercase letters A–Z respectfully and binary numbers 11010–11111 are mapped to numerals 3–8 respectively.) The reason for this is that when a message is received on a channel, alphabetic case is ignored in comparing the channel ID 110 in the channelized address 106 of the message to those of active channels. Using this method, by way of example, if a user maintains 128 ($2^7$) open channels, an adversary has approximately one chance in $2^{45-7}$ (about 275 billion) of guessing an open channel with one message. A brute force attack (sending 100 billion messages to the same host) is impractical in today's Internet.

Although generation of the security string 114 using the cryptographically unpredictable BBS generator method has been described as a preferred method, other possible random bit generators that are practically unpredictable could also be used.

The other part of the channel ID 110, the channel class indicator 116, gives an indication of how mail on that channel will be treated by the user/recipient. In a presently preferred embodiment, there are three classes of channels indicated by the channel class indicator 116: channel class 0 indicates a send-only channel, channel class 1 indicates a private channel, and channel class 2 indicates a public channel. These various classes are indicated in FIG. 1B by reference number 116 at the beginning of the channel ID 110. Thus, in the example illustrated in FIG. 1B, the channel class indicator 116 is set to "1", indicating a private channel.

A send-only channel (channel class 0) is one that is permanently closed to incoming e-mail. This may be useful when a user wants to send a message to a public or adversarial address without providing the recipient with any access channels or addresses to which the recipient could send unsolicited e-mail. A private channel (channel class 1) is used when the user expects only one or a limited number of known or identified correspondents to send e-mail on that particular channel. A public channel (channel class 2) allows previously unknown correspondents to send on it.

One purpose for explicitly identifying the channel class indicator 116 in the channel ID 110 is as a courtesy to correspondents. Once a correspondent notices which channel is open for her use, she can determine her response options. For example, the correspondent will not bother trying to send a return message on a send-only channel (channel class 0).

Although three channel classes have been described herein, it is understood that any number of user-defined channel classes may be used. For example, as an alternative to the channel classes described above, the following classes could be implemented: channel class 0 for a send only channel; channel class 1 for a private channel; channel class 2 for a permanent public channel; channel class 3 for a temporary public channel; channel class 4 for a commercial channel; and channel class 9 for an introductory channel. A permanent public channel (channel class 2) is open for an unlimited time, whereas a temporary public channel (channel class 3) is open for a limited predetermined time. A commercial channel (channel class 4) may be used for commercial traffic.

In an embodiment with an introductory channel (channel class 9) (or alternatively, any public channel class), the introductory channel may be configured as a public, "pay-per-view" channel having a well-known address. Each channel user may use a powerful filtering agent (for example the Andrew Message System's FLAMES language discussed above) to establish a well-known public channel identifier, for example "9INTRODUCE". If a message to this channel does not contain an electronic money (or "e-money") payment, such as electronic checks or cash, of some reasonable fee (for example, $1.00), then the system could send an automatic message informing the correspondent that the user will not read the message unless the proper fee is forwarded. The reply would also inform the correspondent that, if after reading the message, the correspondent is found to be "friendly", or non-commercial (e.g., not "junk" e-mail), the fee will be refunded by the user. If the message is retransmitted and determined by the user to be junk or otherwise inappropriate, then the user may retain the fee. Alternatively, if the retransmitted message is a legitimate attempt at contact, the user refunds the fee. Such a channel address could be published in directories. The risk of unwanted e-mail is reduced by setting an appropriate access fee for unknown correspondents since there is presumably a price that advertisers will not pay for mass-mailings. This approach allows access to long-lost friends and relatives since the fee will be immediately refunded in the case of a "friendly" correspondent.

A user may allocate a number of the channelized addresses 106 having differing channel identifiers 110 for different correspondents. Other than the channel ID portion of the channelized address, the address may look the same for all correspondents. If a correspondent desires to send e-mail to the user, the correspondent must send the e-mail identifying the correct channel; that is, by using an open (or active) channelized address 106 with the proper channel identifier 110. If the correspondent sends to a channel that has not been opened or that has been closed as is described below, the e-mail from the correspondent will be rejected by the user's mail server and the user will never receive it. A goal is thus to control access to a user's mailbox by potential correspondents, not to ensure anonymity of the account owner/user, or to guarantee privacy of the messages.

Referring now to FIG. 2, the architecture for an embodiment implementing the system is illustrated. The hardware involved is connected to a network 200 for sending and receiving e-mail. This network may be the Internet, or any other network capable of transferring e-mail.

Connected to the network 200 is a mail server 202. In a preferred embodiment, this can be implemented with a Sun Work Station, and in particular a Sparc Station 2, available from Sun Microsystems running a UNIX operating system. It is understood, however, that other suitable computers may be used as the server 202.

The server 202 is connected to a personal channel agent host ("PCA host") 204, which is a computer that acts as a host machine for the personal channel agent ("PCA") 214. In a preferred embodiment, the PCA host 204 can be implemented with a Macintosh IIfx, available from Apple Computer, running a MAC OS operating system. It is also understood that other suitable computers could be used as the PCA host 204. The PCA 214 may be implemented in software code written, for example, in the Common Lisp language. It is also understood that the PCA 214 could be implemented using other software languages and also in hardware or in a combination of hardware and software.

The PCA host 204 is connected to a user machine 206. The user machine acts as the user interface to the network 200 for sending and receiving e-mail. In a preferred embodiment, the user machine 206 may be implemented with a personal computer, for example a Dell Pentium 90, available from Dell Computer Corporation, running a Windows 95 operating system available from Microsoft Corporation. It is understood that other suitable computers could be used for the user machine 206.

Within the mail server 202 is a mail receiver 208 and a mail sender 210. The mail receiver 208 and mail sender 210 can be implemented using a modified form of the Unix "Sendmail" program. In particular, the Sendmail program is modified as described with respect to steps 604 and 608 shown in FIG. 6. The mail receiver 208 is a "daemon" program. In other words, the mail receiver 208 constantly checks to determine whether any mail has arrived from the network 200. Preferably, the mail receiver 208 receives e-mail from the network 200 on path 220 using the Simple Mail Transfer Protocol ("SMTP"), although other conventional formats could also be used. The mail sender 210 preferably sends mail to the network 200 on the path 222 using the SMTP protocol, although other conventional formats could also be used. In the SMTP protocol, a message is transmitted with an envelope that specifies the sender and the recipient(s). The message itself comprises header lines (to, from, subject, date, etc.) followed by a blank line followed by the body of the message. The server 202 also contains a channels file 212, which is described below.

Within the PCA host 204 is the PCA 214. The PCA 214 receives mail from the mail receiver 208 via path 216. The PCA 214 is configured to periodically check the mail server 202 for new e-mail. Path 216 preferably uses the POP3 protocol to transfer the e-mail from the mail receiver 208 to the PCA 214. The POP3 protocol is enabled by running a software product, such as "POPPER" (which can be obtained from the Internet at ftp.CC.berkeley.edu) on the mail server 202. Other known implementations of the POP3 protocol, as well as other known protocols, could also be used. The PCA 214 also forwards e-mail to the mail sender 210 via path 218. Path 218 preferably uses the SMTP protocol to transfer e-mail from the PCA 214 to the mail sender 210. Other known protocols could also be used on path 218. The PCA 214 also transfers data via path 224 to the channels file 212. In a preferred embodiment, this data is transferred using the File Transfer Protocol ("FTP") along path 224. Of course, other known protocols could be also used. The PCA 214 also has a User Channel Database ("UCDB") 226, which is described below.

Within the user machine 206 is a mail client 228. In a preferred embodiment, the mail client 228 may be implemented with the Netscape Mail Client and Browser available from Netscape Communications Corp. Of course, other well known mail clients could also be used. The mail client 228 communicates with the PCA 214 via paths 230 and 232. Path 230 is preferably used for receiving e-mail from the PCA 214 using the POP3 protocol. Path 232 is preferably used for sending e-mail from the mail client 228 to the PCA 214 using the SMTP protocol. Although paths 230 and 232 have been described using the POP3 and SMTP protocols, respectively, other known protocols may also be used.

Also within the user machine 206 is a web browser 234. In a preferred embodiment, the web browser 234 could be implemented with the Netscape Navigator provided by Netscape Communications Corp. The web browser 234 is used to administer the PCA 214 including the UCDB 226. The web browser 234 preferably communicates with the PCA 214 along path 236 using the Hypertext Transfer Protocol ("HTTP"), although other known protocols may also be used.

Other combinations of a user machine 206a, PCA host 204a, and mail server 202a, may also be connected to the network 200. Their configuration may be the same as that described for the combination of user machine 206, PCA host 204, and mail server 202. In FIG. 2, the interconnections and components of combination 206a, 204a, and 202a are the same as described for combination 206, 204, and 202. To illustrate this, components in combination 206a, 204a, and 202a are labeled with reference numerals corresponding to those in combination 206, 204, and 202, except that the suffix "a" is added at the end of each reference number. For instance, PCA 214 in combination 206, 204, and 202 corresponds to PCA 214a in combination 206a, 204a, and 202a. Corresponding components may be described in like fashion.

Figure 3:
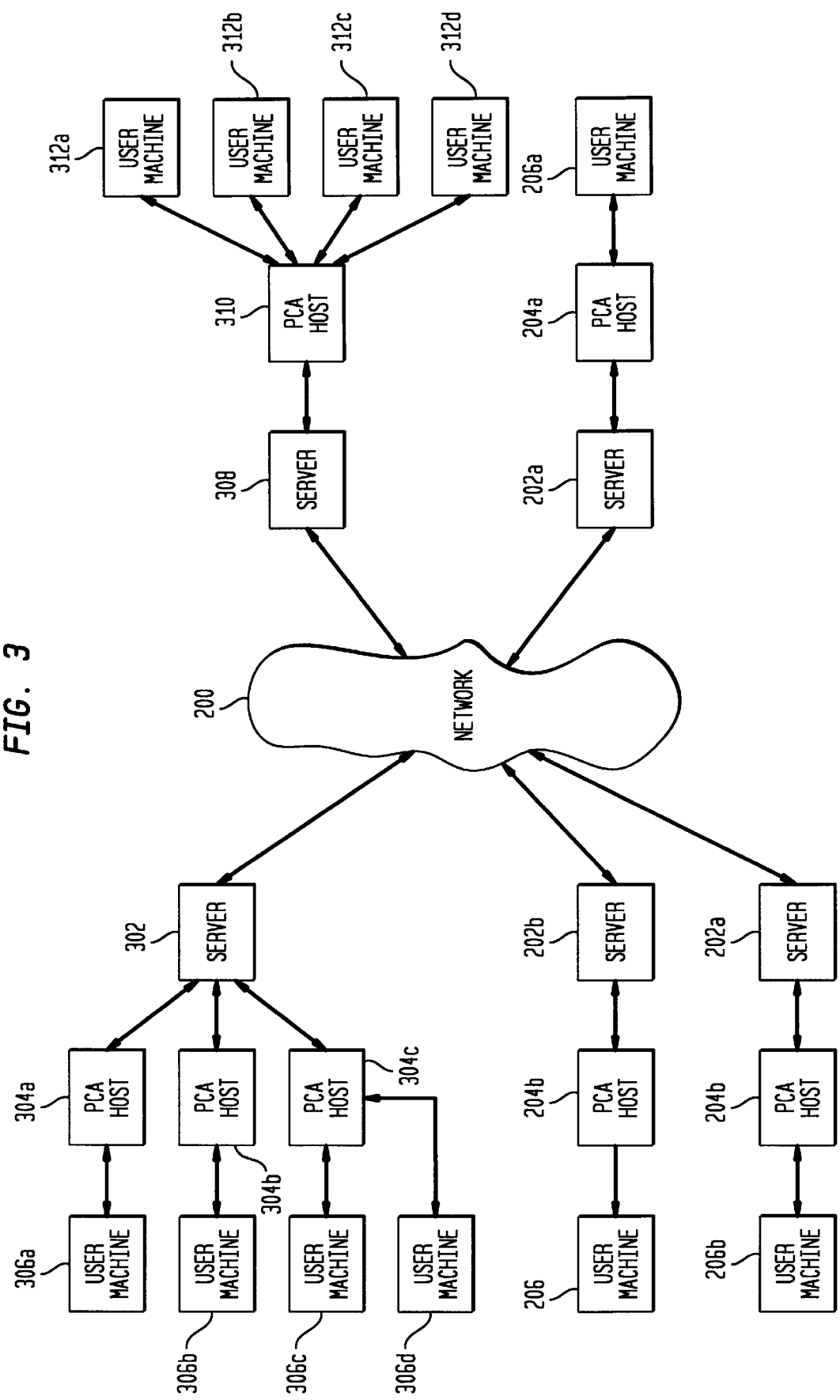
FIG. 3 is a block diagram illustrating a system configured according to an embodiment of the present invention.

Although, FIG. 2 illustrates connections for two user machines 206 and 206a, it is understood that, as with any network, many other machines may be connected to the network 200 for sending and receiving e-mail. As illustrated in FIG. 3, many user machines 206, 206a, 206b, 306a, 306b, 306c, 306d, 312a, 312b, 312c, and 312d may be connected to the network 200. In addition, while the preferred embodiment has been illustrated in FIG. 2 as having one user machine 206 and one PCA host 204 used with one mail server 202, it is understood that in other embodiments, more than one user machine may be connected to a single PCA host. In FIG. 3, two different configurations for connecting multiple user machines to a server are shown. In one embodiment, separate PCA hosts 304a and 304b may be provided for connecting each corresponding user machine 306a and 306b to a single mail server 302. In another embodiment, a single PCA host 310 may be used for connecting multiple user machines 312a, 312b, 312c, and 312d to the mail server 308. This is also shown by user machines 306c and 306d connected to a single PCA host 304c and to the mail server 302.

Referring to FIG. 2, conceptually, the PCA 214 acts as an e-mail proxy, sitting between the user's mail client 228 and the mail server 202. Thus, all incoming and outgoing messages pass through the PCA 214, which uses appropriate protocols as discussed above to interact with the mail client 228 and mail server 202. This positioning allows the PCA 214 to autonomously perform various bookkeeping functions, thereby shielding the user from them.

The architecture described above and illustrated in FIG. 2 allows the PCA 214 to run on a PCA host 204 separate from the mail server's host 202 so that any additional computational load incurred by the PCA 214 can be appropriately distributed. The only additional load necessarily incurred by the mail server 202 when the PCA 214 is on its own host 204 is in parsing the address (dividing the channelized address into a user name and a channel ID), plus the time to check the channels file 212 as will be described below. This is only significant for large channels files or slow file access. If users want to keep open many channels, the file 212 may be compiled by the PCA 214 into a format supporting faster access than a flat file, which is used in one embodiment.

Although FIG. 2 (and FIG. 3) illustrate a preferred embodiment where the PCA 214 is located on a different piece of hardware (PCA host 204) than the server 202 and user machine 206, it is understood that the PCA 214 could alternatively be located on the user machine 206 or on the server 202, thus eliminating the need for the PCA host 204.

The user channel database (UCDB) 226 primarily records two mappings, the channel map and the correspondent address map. The channel map associates each correspondent with the channel on which the user expects to receive mail from that correspondent. The correspondent-address map associates each correspondent's user and host names with the channel ID (if one exists) on which the user is allowed to send to the correspondent.

The UCDB 226 (or 226a) is conceptually illustrated in FIG. 4. The headings in each column are not actually stored in the database 226, but are provided in FIG. 4 for illustrative purposes. For each correspondent address 402, the UCDB 226 may have one or more of the following entries: own channel 404, correspondent channel 406, own key 408, and correspondent key 410. A correspondent is simply another e-mail user that the user desires to send to or receive mail from. The correspondent address 402 is the standard e-mail address of the correspondent. The own channel 404 is the channel ID 110 used for the correspondent to send e-mail to the user. The correspondent channel 406 is the channel ID 110 that must be used by the user to send e-mail to the correspondent. The own key 408 is a key assigned by the user that is necessary to allow certain functions to be performed (as will be discussed below). The correspondent key 410 is a key assigned by the correspondent, which is also necessary to allow certain functions to be performed (as will also be discussed below). All of this information is placed in the UCDB 226 by the PCA 214 as it interacts with the mail server 202 and the user machine 206.

So, for example, as illustrated in FIG. 4, for the correspondent address 402 "frobboz@geewhiz.com", the following information is stored in the UCDB 226: own channel 404=1QXR7112PH; correspondent channel 406= 1DDYWA7H7I; own key 408=X9GWAAH4T; and correspondent key 410=T7AA18MMN. For the correspondent address 402 "jrandom@j.r.isp.net", all of the entries are similarly filled except for the correspondent key entry 410. This is because the correspondent key information has not yet been received from the correspondent, possibly because it is not yet needed. Nevertheless, the UCDB 226 can store this correspondent key information when (and if) it is received.

The first two own channels 404 listed in FIG. 4, "1QXR7112PH" and "122PG3LWAW", begin with the number "1". This number is the channel class indicator 116 discussed above and preferably indicates (because it is set to "1") that these are private channels as described above. The next two own channels 404 listed in FIG. 4, "2AA47WX3BQ" and "2BZZ86A9FC", begin with the number "2". This channel class indicator 116 identifies these channels as public channels as described above. Therefore, these two channels do not require entries for correspondent address 402, correspondent channel 406, own key 408, or correspondent key 410, because any one of a number of correspondents may send e-mail on these public channels (using the public channel ID). The correspondent channel 406 associated with the correspondent address 402 "info-hooha@sri.com" shown in FIG. 4 is "0XTRR9Y680". Because this channel class indicator 116 begins with the number "0", this indicates that this channel is a send-only channel as described above. Therefore, there is no need for an entry for correspondent channel 404 or correspondent key 410 because no return messages will be accepted on this channel from any correspondent. In one embodiment, there is an own key entry 408 (in this case "BZTGRTKI3") because the system automatically generates an own key every time a new correspondent is entered into the UCDB. In the case of a send-only channel, this key would not be used.

In FIG. 4, a correspondent address such as "jrandom@j.r.isp.net" may have no entry for the correspondent channel field 406 if that correspondent does not use channelized addresses. In other words, that correspondent expects e-mail addresses as shown in FIG. 1A, or whatever the standard format is for that system.

Figure 6:
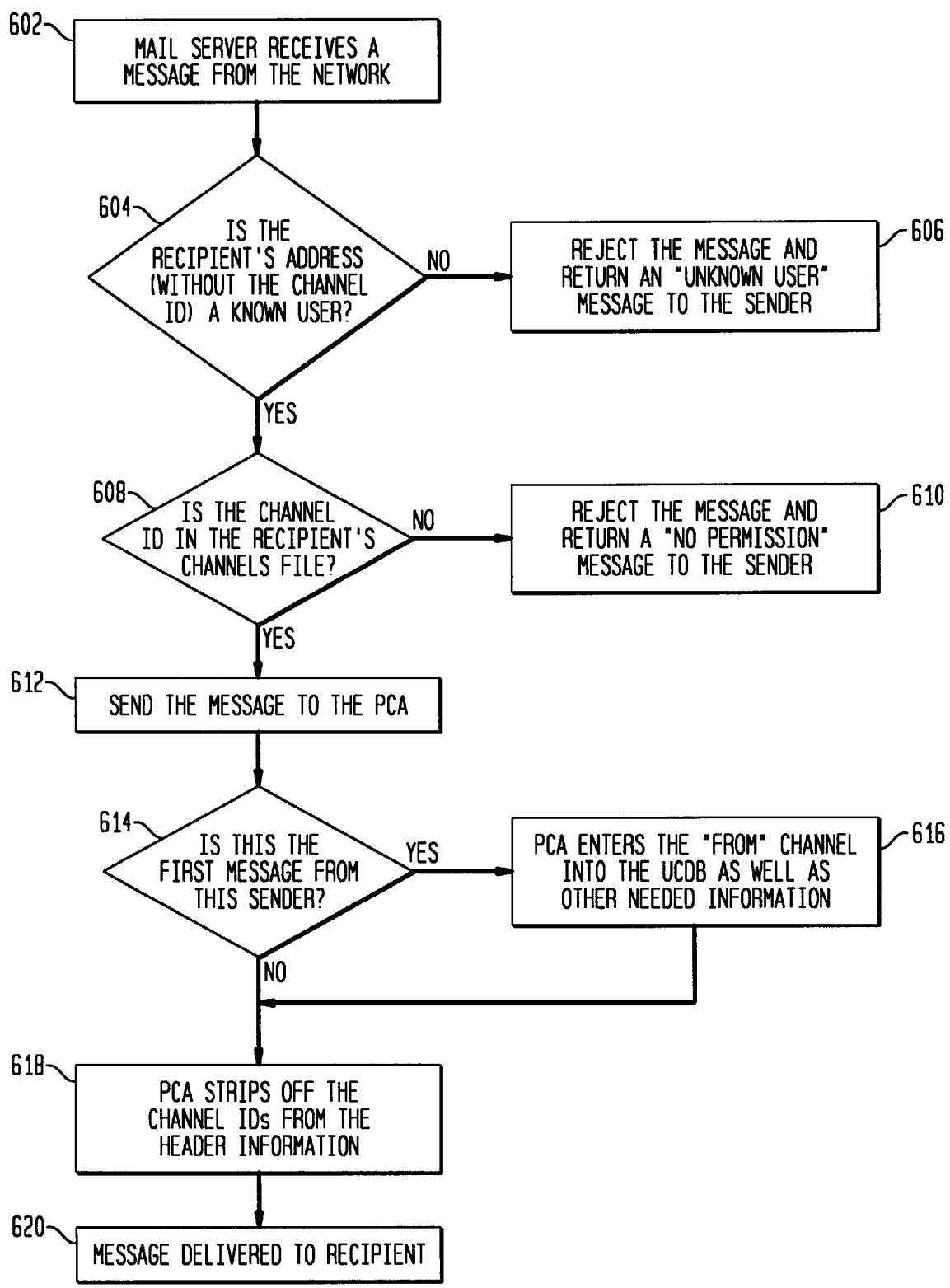
FIG. 6 is a flow diagram illustrating the process of receiving an e-mail message.

Referring again to FIG. 2, the mail receiver 208 and mail sender 210 may be implemented in a preferred embodiment using a modified Unix "Sendmail" mail transfer program. It is understood that other mail transfer programs could also be used if analogous changes are made thereto. The modification involves changing the sendmail code so that when Sendmail is about to look up a user's name in the system's password file (a standard database defining the valid users of the system), it will first separate the address into a "true" user name and channel ID. Then, assuming the normal password file check succeeds for the true user name (FIG. 6, step 604, discussed below), the corresponding user's home directory is checked for a channels file 212 containing a list of open channels (FIG. 6, step 608, also discussed below). If the channel ID of an incoming message matches one of the lines in the channels file 212, the message is delivered to the user machine 206 through the PCA host 204. If the channels file 212 does not have a match, the message is refused with a "no permission" error. The message is also rejected if the address has no channel ID at all. The channels file 212 must be readable and writable only by the user and the Sendmail program to prohibit others from gaining unauthorized knowledge of open channels.

Referring now to FIG. 5, a conceptual diagram of the channels file 212 is illustrated. The heading on the column "Open Channels" is illustrative only, and such a heading is not actually stored in the channels file 212. The channels file 212 has a list of channels 501 that have been open by the user. Opening channels may be accomplished with a user interface as described with reference to FIG. 11. In the example shown in FIG. 5, the first channel listed is "1QXR7112PH". These channels are checked by the modified Sendmail program when a message is received by the mail receiver 208. The channels file 212 is updated regularly by the PCA 214 from information that has been entered in the UCDB 226. This information is stored in the own channel field 404 of the UCDB, as shown in FIG. 4.

Referring now to FIG. 6 (with reference also to FIG. 2), the process of receiving a message will be described. In step 602, the mail server 202, through the mail receiver 208, receives a message from the network 200. The mail receiver 208 is implemented using the modified Sendmail program. In step 604, the system determines whether the recipient's address (without the channel ID) is the address of a known user of the system. This comparison is done without using the channel ID 110, therefore the system must first parse the address. If the recipient's address is not an address of a known user, in step 606, the system rejects the message and returns an "unknown user" message to the sender of the message. If the recipient's address is that of a known user, in step 608, the modified Sendmail program checks the channels file 212 to determine whether the channel ID 110 in the incoming message is in the recipient's channels file. If the channel ID 110 is not in the recipient's channels file 212, in step 610, the system rejects the message and returns a "no permission" message to the sender. If the channel ID 110 in the incoming message is in the recipient's channels file 212, in step 612, the message is sent to the PCA 214 via the path 216.

In step 614, the PCA 214 determines whether this is the first message from this sender. If this is the first message from the sender, the PCA enters the "from" channel into the UCDB 226 in step 616. This is entered in the correspondent channel field 406 illustrated in FIG. 4. The correspondent address field 402 is also filled in at this time. The system then proceeds to step 618. If, in step 614, it is determined that this is not the first message from this sender, the system also proceeds to step 618.

In step 618, the PCA 214 strips off the channel IDs from the header information (i.e. "to", "from", "cc", etc.) in the message. The PCA 214 then sends the e-mail message to the mail client 228 via path 230 in step 620.

Figure 7:
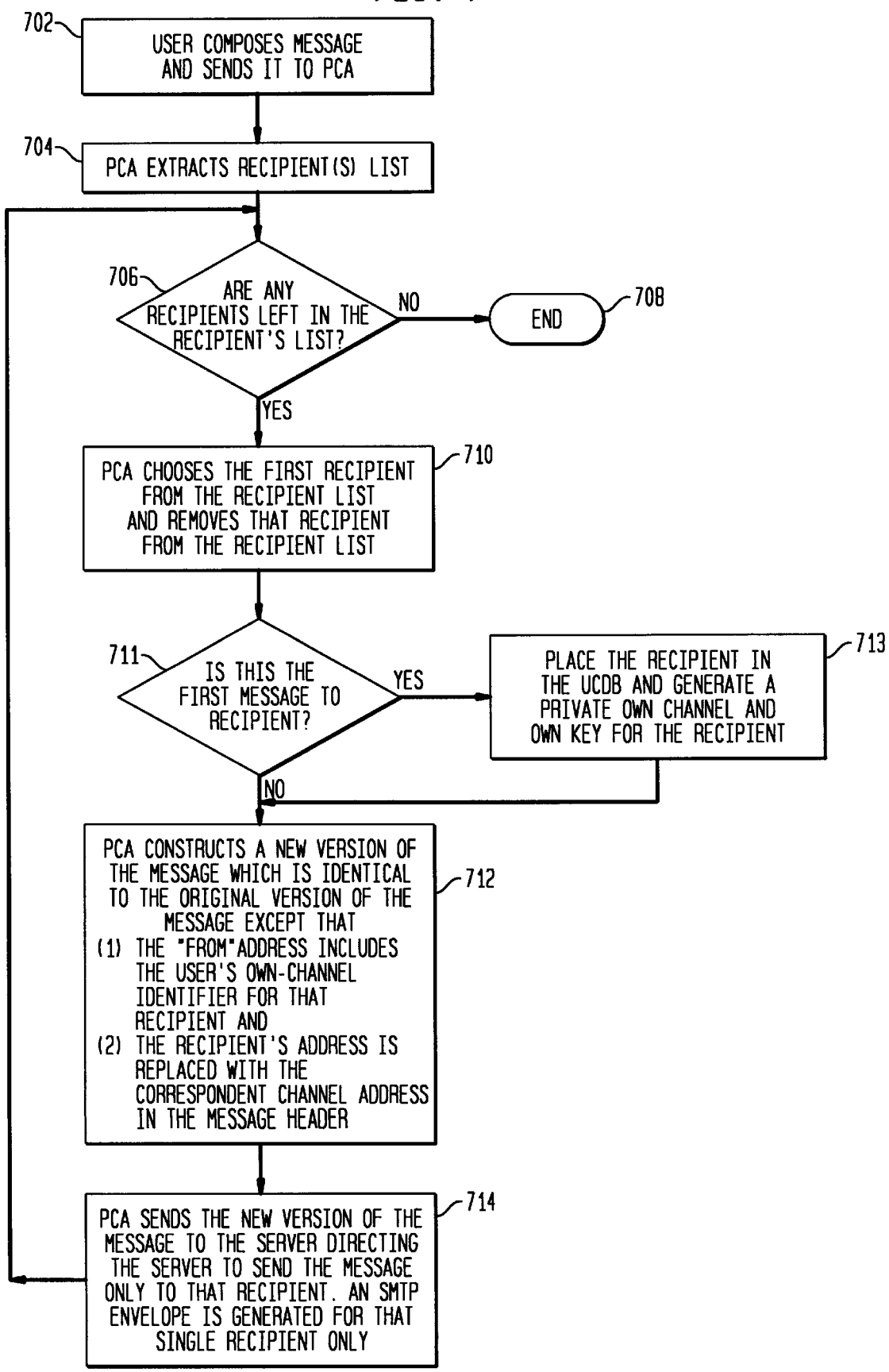
FIG. 7 is a flow diagram illustrating the process of sending an e-mail message.

Referring now to FIG. 7 (and also in part to FIG. 2), the process by which a user sends a message to a correspondent or a list of correspondents will now be described. In step 702, the user composes a message. The message will have a "to" field and a "from" field in a header as is known in the art. This message may be to more than one recipient or to a list of recipients, including people on a "cc" list. In any case, in step 702, the user sends the message from the mail client 228 to the PCA 214 through path 232. Next, in step 704, the PCA 214 extracts a list, called a "recipients list", of all the recipients who are to receive a copy of the e-mail message. In step 706, the PCA 214 determines whether there are any recipients left on the recipients list. If there are no remaining recipients, the process ends at step 708. If there are remaining recipients, in step 710, the PCA 214 chooses the first recipient from the recipients list and removes that recipient from the recipient list.

In step 711, the PCA 214 determines whether this is the first message sent to this recipient. If this is the first message to the recipient, the PCA enters a "to" (or own) channel into the UCDB 226 in step 713 which the PCA 214 automatically generates. This is entered in the own channel field 404 illustrated in FIG. 4. In addition the correspondent address field 402 and correspondent channel field 406 (if any) are filled in at this time as necessary. In a preferred embodiment, the PCA creates a private channel (class 1). The PCA also automatically at this point creates an "own key" and enters it in the own key field 408 of the UCDB 226. The system then proceeds to step 712. If, in step 711, it is determined that this is not the first message sent to this recipient, the system also proceeds to step 712.

Next, in step 712, the PCA 214 constructs a new version of the message, which is identical to the original version of the message, except that the "from" address includes the user's own channel identifier for that recipient and the recipient's address is replaced with the correspondent's channelized address in the message header. That is, a channel ID 110 is added to that recipient's address. This information is taken from the UCDB 226. In particular, as shown in FIG. 4, the own channel address is taken from the own channel field 404 and the correspondent address is taken from the correspondent channel field 406. Next, in step 714, the PCA 214 sends the message to the mail server 202 and, in particular, the mail sender 210 via path 218, indicating in the SMTP envelope the single intended recipient. The mail sender 210 then sends the message to the intended recipient in the network 200. The system then returns to step 706 and determines whether any recipients are left on the recipients list. This continues until all recipients have been addressed and the message has been sent to all recipients. It should be noted that in step 712, if the recipient does not use channels, the PCA 214 will not insert the correspondent's channel in the recipient's address, as there would be no need to.

It will be observed that the PCA 214 rewrites the headers and envelope information if any (e.g. SMTP) of each message as it comes in (step 618, FIG. 6) and goes out (steps 712 and 714, FIG. 7). Essentially, the PCA 214 removes the channel ID's from all addresses in incoming messages (excluding those, if any, in the body portion of the message) before serving the message to the mail client 228 (step 618). This solves the problems relating to accidentally disclosing channel IDs to third parties when including a received message in an outgoing message such as when a reply or forward command is used. Thus, the user need not worry about editing the channels ID out of the message headers. Of course, since the message body is not altered by the PCA 214, there may be channel IDs in the body. However, these channel IDs must have been manually inserted to appear there.

For outgoing messages, the PCA 214 puts back channel IDs selectively before forwarding the message to the mail server 202 (step 712). For a single recipient message, the PCA 214 simply puts the channel ID of the recipient into the recipient (or "to") fields (obtained in the correspondent channel field 406 of the UCDB 226), and the return (or "own") channel allocated to the recipient into the address in the sender (or "from") field (step 712). Multi-recipient messages are copied, and each copy is tailored (as in the single-recipient case) to a specific recipient (steps 706, 710, 712). Then each tailored copy is sent to the designated recipient using a tailored SMTP envelope (step 714). This solves the problem of different recipients obtaining improper access to the recipient's private channels, because each recipient sees only information she already knows.

Thus, to the user of a PCA 214, virtually all messages appear without channel IDs, and hence e-mail looks and feels like traditional e-mail. This is illustrated in FIGS. 8A and 8B. FIG. 8A shows a version of an e-mail message that the sender and/or receiver actually views if they are both using a PCA 214. The sender merely inputs the "From" address or field 802, in this case "hall@research.att.com". This may preferably be automatically inserted by the mail client program. The user also inputs (possibly by using a keyboard) the "To" field 803, in this case "frobboz@geewhiz.com", and the "Cc" field 804, which is in this case "jrandom@j.r.isp.net." The user may then input his message body 805. The PCA 214 converts this to what is shown in FIG. 8B for transmission to the recipient in the "To" field 803a. The PCA 214 adds to the "From" field 802a a channel identifier 810 and adds to the "To" field 803a a channel identifier 812 as described above. It should be noted that no channel identifier is added to the "Cc" field 804a because the first copy of this message will be sent to the recipient indicated in the "To" field 803a. Thus, there is no need for the "To" recipient 804a to receive the channel ID of the "Cc" recipient. The PCA 214 will then generate another version of this message to the "Cc" recipient 804a in which a channel ID will be inserted for the "Cc" recipient 804a but will be removed for the "To" recipient 803a. As can be seen in FIG. 8B, the message body itself 805a has not been changed. Upon receipt of the message, the PCA 214a will strip out the channel identifiers 810 and 812, and the message will appear again as in FIG. 8A.

Occasionally, it may be desirable to switch a correspondent from one channel to another, either because the old, multi-user channel is known to too many adversaries, or because the user wishes to "upgrade" that correspondent's access, for example from public to private (or in another embodiment, temporary to permanent). If the correspondent does not use a PCA 214, this requires notifying the correspondent to make a manual change in the correspondent's address book. In this case, the PCA 214 can help only in automatically sending out a notification as a normal message. However, if the correspondent also uses a PCA 214, the switching may be automated via the channel switching protocol shown in FIG. 9. This allows the user's PCA 214 to make a change in the correspondent-address map of the correspondent's UCDB 226a.

Figure 9:
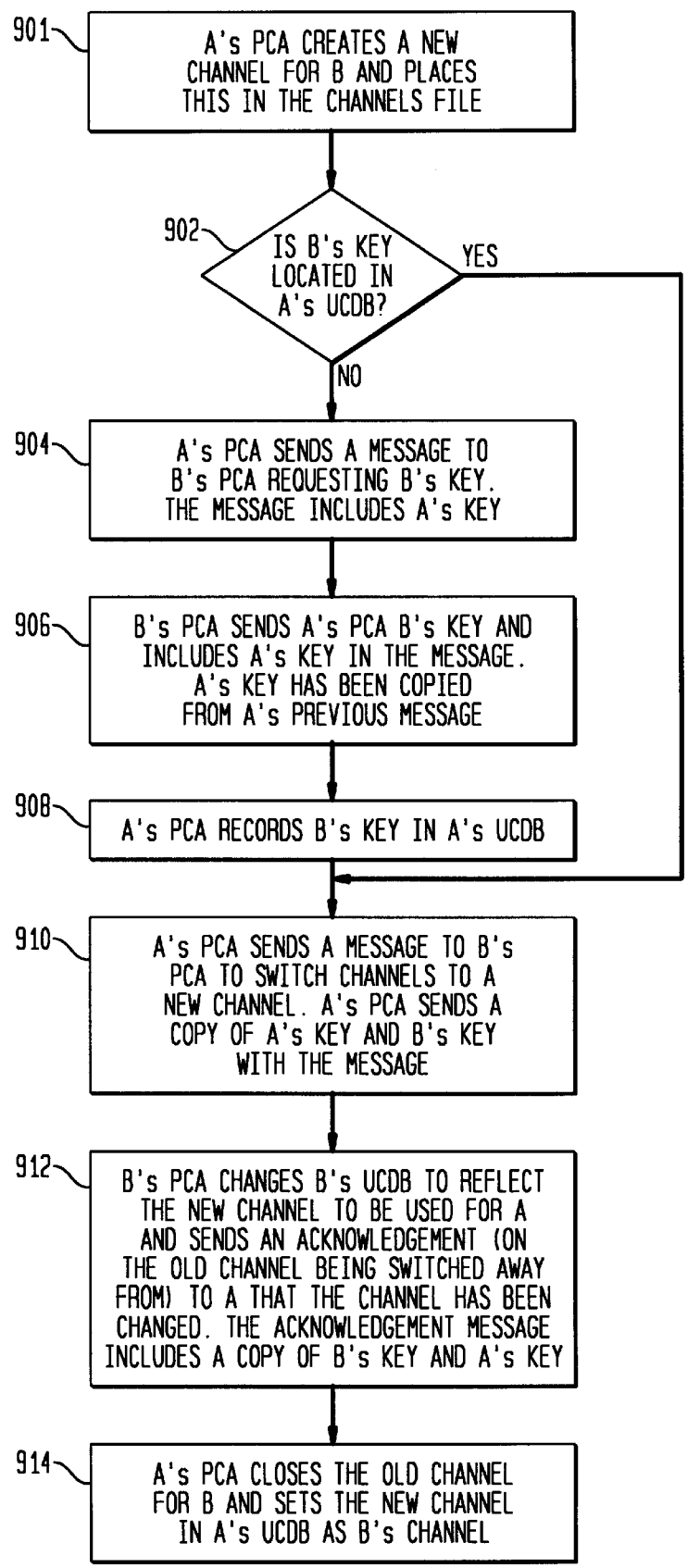
FIG. 9 is a flow diagram illustrating the process of switching e-mail channels.

In a preferred embodiment, when both a user and a sender have PCAs (for example 214 and 214a in FIG. 2), the channel switching protocol of FIG. 9 may be used. To use this protocol, the user (108, FIG. 1B) and host (112, FIG. 1B) parts of the address must remain the same. The PCA will only change the channel ID part (110, FIG. 1B). This prohibits an adversary from, for example, tricking a PCA 214 into sending private messages to an embarrassing public forum. Also, in a preferred embodiment, the PCA 214 will be configured to allow channel changes only when the channel class indicator 116 does not increase in magnitude. Thus, for example, a private channel cannot be switched to a public channel. Thus, assuming the user's attention is higher for lower-numbered channel classes, the PCA 214 will not be tricked into downgrading a correspondent so that messages might be ignored longer than expected.

The protocol illustrated in FIG. 9 may secure against attacks by "non-eavesdroppers." Moreover, channel switches caused by eavesdroppers (e.g., those who are listening on or tapping the communication line) may be detected and the parties notified so that appropriate action may be taken.

Referring now to FIG. 9 and FIGS. 10A, 10B, 10C, 10D and 10E, the process for switching a channel when a user and a correspondent both have PCAs will now be described. In FIG. 9, the letter "A" refers to a user who wishes to change a channel that a correspondent, referred to as "B", uses for sending e-mail to user A. When referring to FIGS. 10A through 10E, user "B" is represented by "frobboz-1DDYWA7H7I-@geewhiz.com". Similarly, in FIGS. 10A through 10E, user A is represented by "someone-1QXR7112PH-@domain.com". In addition, FIG. 2 should also be referred to wherein it will be assumed by way of example that A is using user machine 206 and B is using user machine 206a.

Once a user (A) has decided that he wants to switch the channel that a correspondent (B) uses to communicate with the user (A), the system first, in step 901, creates and opens a new channel to be switched to. The new channel is placed in the channels file. Next, the system determines in step 902 whether correspondent B's key is located in user A's UCDB 226. In particular, the key would be located in the "correspondent key" field 410. If not, user A's PCA 214 sends a message to correspondent B's PCA 214*a* requesting correspondent B's key in step 904. The message also includes user A's key so that correspondent B can include it in the reply. This message is illustrated in FIG. 10A wherein a "send your key" message 1001 is sent. User A's key 1002 is included in this message.

Next, in step 906, correspondent B's PCA 214A sends user A's PCA 214 correspondent B's key and includes user A's key in the message. User A's key has been copied from user A's previous message (FIG. 10A). This allows user A to know that correspondent B's message is legitimate. In step 906, A's channelized address and B's key are taken from B's UCDB 226*a*. If B's UCDB 226*a* has no entry for user A, the message in step 906 is not sent. FIG. 10B illustrates the message sent in step 906. Correspondent B is sending a "my key is" message 1004 to user A so that user A acquires correspondent B's key, in this case "T7AA18MMN". In the message, user A's key 1006 is included for authentication. User A's PCA 214 records correspondent B's key in user A's UCDB 226 in step 908.

The system next proceeds to step 910, which is also where the system would proceed if in step 902 it was determined that correspondent B's key was already located in user A's UCDB 226. In step 910, user A's PCA 214 sends a message to correspondent B's PCA 214*a* to switch to a new channel. User A's PCA 214 sends a copy of correspondent B's key as well as A's own key in this message. Such a message is illustrated in FIG. 10C. In FIG. 10C, the message to change channels to a new channel 1008, in this case "1L3RG3592T", is forwarded to correspondent B. Included with this message is a copy of correspondent B's key 1010 so that user B knows correspondent A's message is legitimate. A's key is also included 1006.

Next, in step 912, correspondent B's PCA 214*a* changes correspondent B's UCDB 226*a* to reflect the new channel to be used to correspond with user A. Also, in step 912, correspondent B's PCA 214*a* sends an acknowledgment on the old channel to user A that the channel has been changed. The acknowledgement message includes a copy of user B's key for authentication as well as a copy of A's key. This type of message is illustrated in FIG. 10D. In FIG. 10D, an acknowledgement message 1011 is sent along with user B's key 1010 and A's key 1006 as well as the new channel 1012.

Next, in step 914, user A's PCA 214 closes the old channel for correspondent B and sets the new channel as B's channel in user A's UCDB 226. Following this, an exemplary message that could be sent from user A to correspondent B is illustrated in FIG. 10E. It should be noted that the new channel identifier 1016 is placed in the "To" field for sending to the user (A) who has switched channels.

This protocol illustrated in FIG. 9 can be used to detect eavesdroppers. For example, if user A's PCA 214 receives a second "my key is" message (for example like that shown in FIG. 10B) indicating correspondent B's key, as in step 906, which message includes user A's valid key, but a different key is indicated for correspondent B, then user A knows that an eavesdropper has sent one of these two messages. Thus, an eavesdropper has been detected and user A may alert correspondent B of this situation. In addition, if user A's PCA 214 receives a "my key is" message (for example like that shown in FIG. 10B) (as in step 906) providing correspondent B's key that is not expected (i.e., step 904 has not occurred), then an eavesdropper detection can also be entered. Finally, if user A's PCA 214 receives an acknowledgement that a change in channels has occurred (for example like that shown in FIG. 10D) with a valid key from correspondent B, but the change in channel is unexpected, then an eavesdropper detection condition is also entered. When an eavesdropper detection condition is entered, user A may notify correspondent B and appropriate action may be taken. This notification preferably should include correspondent B's key so that correspondent B will know the message is legitimate. This notification could also take place outside of the e-mail environment, for example, by telephone.

Whenever either PCA (214 or 214*a*) receives a channel switch message not containing a correct key, it ignores it.

Keys are generated in the manner described for channel IDs except that the channel class indicator (116, FIG. 1) is omitted. The PCA 214 generates the own key when an entry for a correspondent or channel is created in the UCDB. In a preferred embodiment, the PCA generates a different key for each correspondent/channel.

In another embodiment, to accomplish channel switching the user's PCA 214 may send a digitally signed channel switch message containing the new channel ID to the PCA 214*a* of the correspondent, which verifies authenticity of the message, carries out the change, and then sends a digitally signed acknowledgement back to the user's PCA 214 on the old channel, so that the user's PCA 214 knows when to close the old channel. A digital signature is a string attached to document that is a non-forgable, non-repudiatable "signature" of a document that reliably associates an individual with that document. Digital signatures can be implemented, for example, using PGP or S/MIME compliant applications mentioned above.

Figure 11:
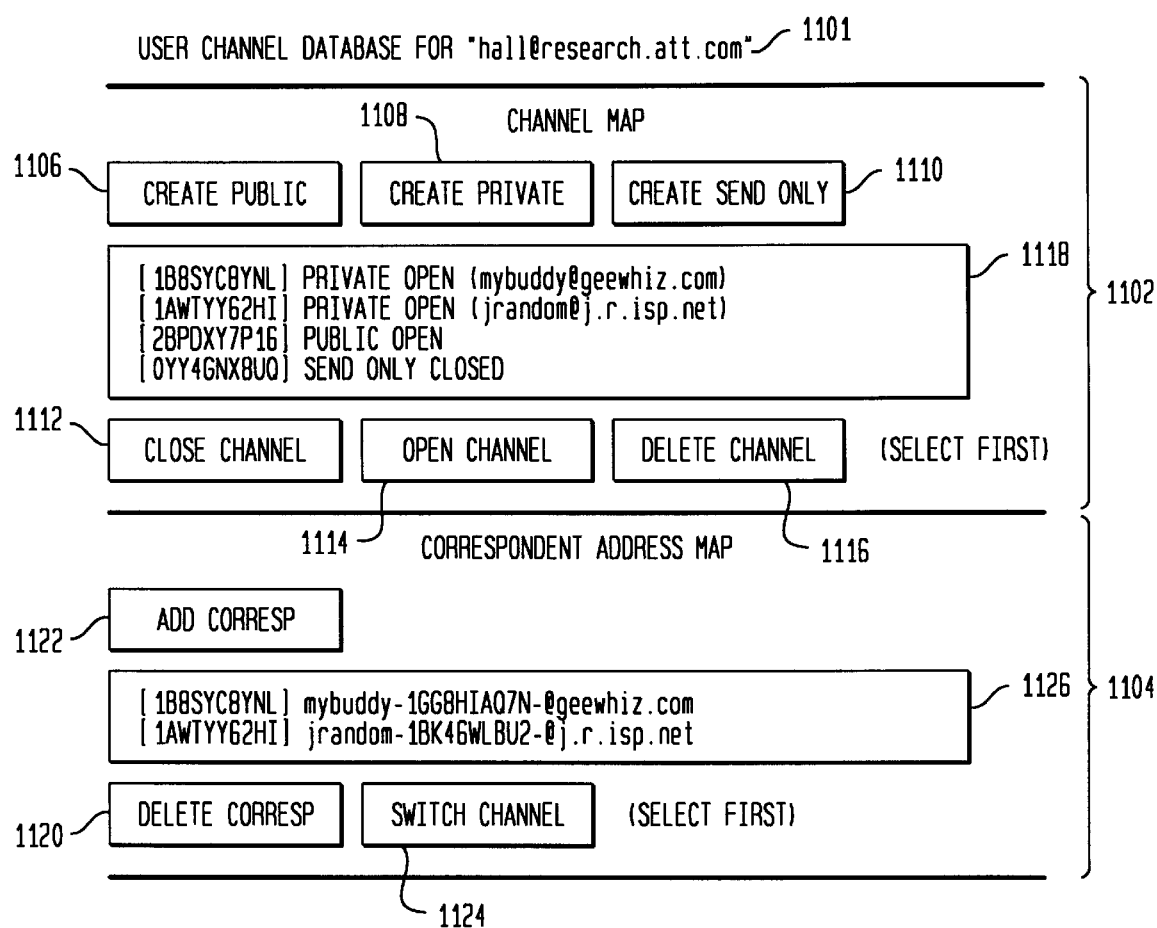
FIG. 11 is a diagram illustrating an interface according to an embodiment of the present invention.

When a user needs to open, close, create, delete or switch channels, the user may use the PCA's administrative interface which is illustrated in FIG. 11. The administrative interface may be used to allocate some new channels (for example for use in mailing lists or as temporary reply channels) or to close or switch channels. This administrative interface is used with the web browser 234 through path 236. The PCA acts as a web server, formatting each page of the administrative interface in Hypertext Markup Language ("HTML") and transmitting it using HTTP over path 236. This web interface allows the PCA 214 to be run on a machine different from the mail client 228 so that the user's mail client machine need not be connected to the network 200 in order for the PCA 214 to carry-out its processing. Moreover, existing browsers and mail clients, such as Netscape Navigator, available from Netscape Communications Corp. may be used with the PCA 214, obviating the need for learning a new native interface. In a preferred embodiment, each user's administrative interface should be password protected.

Referring now to FIG. 11, the administrative interface (shown as it would appear on a computer screen) provides a title 1101 indicating the owner of the UCDB 226 for which the interface has been accessed. The interface acts as a way to modify the UCDB 226, which holds most of the relevant data used by the PCA 214 for a given system user. There are two main components of the interface, a channel map component 1102 and a correspondent address map component 1104. The interface, in the channel map component 1102, provides various buttons for creating a "public" channel 1106, creating a "private" channel 1108, creating a "send only" channel 1110, closing a channel 1112, opening a channel 1114 and deleting a channel 1116. To use buttons 1112, 1114, or 1116, the user must first select an entry from the channel map display 1118.

The channel map display 1118, displays as entries the various channels that are active for that user. For example, the first entry in the channel map display 1118 of FIG. 11 indicates various information for the correspondent "mybuddy@geewhiz.com". In this example, the channel that the correspondent must use to send mail to the user (hall@research.att.com) is "1B8SYC8YNL". There is also an indication that this is a private channel and that it is open. Note, that the third entry in the channel map display 1118, which is accessed through channel "2BPDXY7P16", is a "public" channel as indicated. Therefore, no specific addresses are given for this channel because many users may send mail through the channel. The final entry on the channel map display 1118 is indicated as "closed." This means that no mail may be entered on this channel from a correspondent. Thus, any mail sent to this "closed" channel will be rejected by the PCA 214. It should be noted that simply closing a channel does not remove it from the UCDB, it may be reopened later.

The correspondent address map 1104 provides buttons for deleting a correspondent 1120, adding a correspondent 1122, and switching channels 1124. To use buttons 1120 or 1124, an entry must first be selected from the correspondent address map display 1126. The correspondent address map display 1126 provides various information to the user. For example, the first entry in the correspondent address map indicates the channel that "mybuddy@geewhiz.com" would use to send correspondence to the user; that is, "1B8SYC8YNL". In addition, the address that the user must use to send messages to this correspondent is indicated in its full form with the channel ID ("1GG8HIAQ7N") for sending to that correspondent.

The user interface may be used through a commonly known pointing device, such as mouse. The user "clicks" on the desired action (or entry or button) with a mouse as is known in the art. So, for example, if the user ("hall@research.att.com") desired to change the channel that "mybuddy-1GG8HIAQ7N-@geewhiz.com" used for sending mail to the user, the user would click on the entry for this correspondent on the correspondent address map display 1126. Then the user would click on the "switch channel" button 1124 and the PCA 214 would perform the channel change as described above. As another example, if the user wanted to create a private channel, the user would click on the "create private" button 1108 and enter the necessary data (e.g., correspondent, etc.) by, for example, using a keyboard or other known data entry device.

In another embodiment, a PCA 214 and channelized addresses 106 may be used with Packet Telephony. Packet Telephony is usable over various networks, for example, the Internet. Used on the Internet, it is sometimes referred to as "Internet phone." Channelized addresses may be used in this environment since addresses are not restricted to the standard telephone format.

Figure 12:
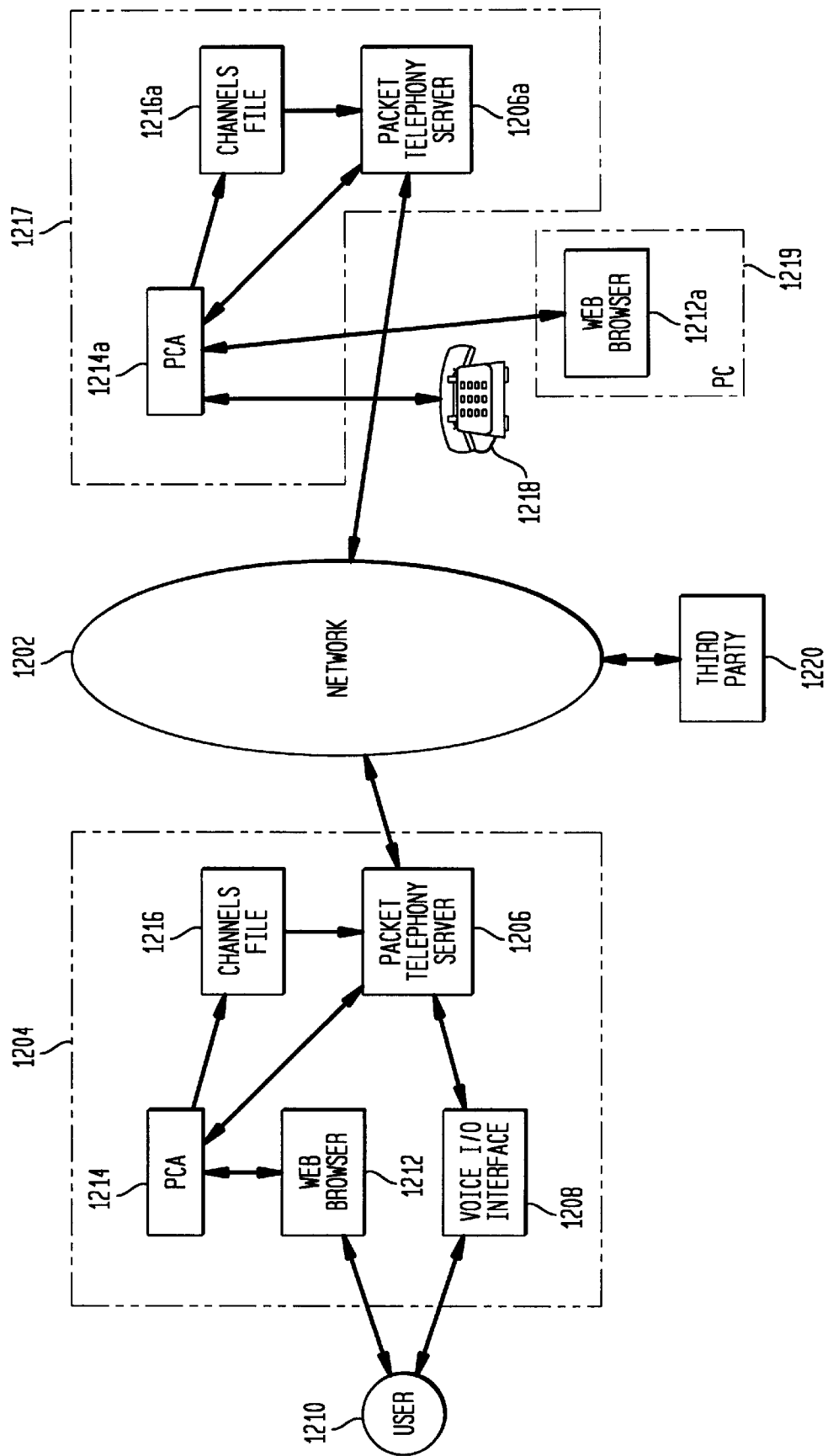
FIG. 12 is a block diagram illustrating a system for using Packet Telephony configured according to other embodiments of the present invention.

Referring to FIG. 12, Packet Telephony may be used over a network 1202. There are at least two exemplary possibilities for using PCA's in combination with such a network 1202 to provide Packet Telephony. The first embodiment may be used with a personal computer ("PC") 1204. The PC 1204 includes a Packet Telephony server 1206 as is known in the art, but modified as described below with reference to FIG. 13. The Packet Telephony server 1206 may preferably communicate with a voice input/output interface 1208. This voice input/output interface 1208 may include a speaker and microphone as is known in the art. The voice input/output interface 1208 is accessible to a user 1210 for "talking to" and "listening to" other users of the network 1202. The user would also have access to a web browser 1212, which may be used to administer the PCA 1214 as described with respect to the previously-described embodiments. The PCA 1214 also communicates with and modifies and updates a channels file 1216. The PCA 1214 also communicates with the Server 1206. The channels file 1216 is read by the Packet Telephony server 1206.

A telephone call may preferably be initiated using the web browser 1212 by providing a "place call" button on an administrative interface (similar to that shown in FIG. 11). A user would select a correspondent entry from a correspondent address map display and then select the "place call" button.

Alternatively, a user could use a standard telephone 1218 to dial up a PCA 1214a which is located remotely on a machine or computer 1217 at a service provider's facility. Using standard dual tone multifrequency ("DTMF") touch tones the user can place telephone calls with the telephone 1218. To administer the PCA 1214a so that it updates or changes a channels file 1216a or a UCDB, the user may access the PCA remotely through a standard web browser 1212a as described for the embodiment shown by 1204, except that a "place call" button would not be needed. This web browser 1212a may be located on a user's PC 1219. Again, as with the embodiment shown by 1204, the Packet Telephony server would be modified as described below.

The Packet Telephony servers 1206, 1206a may communicate with the network 1202 as is known in the art. In both embodiments 1204, 1217, the Packet Telephony server 1206, 1206a would refer to the channels files 1216, 1216a to determine whether or not an incoming call is to be accepted. In addition, although not shown in FIG. 12, the PCA's 1214, 1214a would each have a UCDB which would be the same as for the other embodiments described earlier. For outgoing calls, the UCDB may be referenced to add the appropriate channel ID (if any) to the intended recipient's address.

In FIG. 12, a "third party" 1220 is shown for use in explaining how telephone calls may be sent to and received from that third party 1220.

Figure 13:
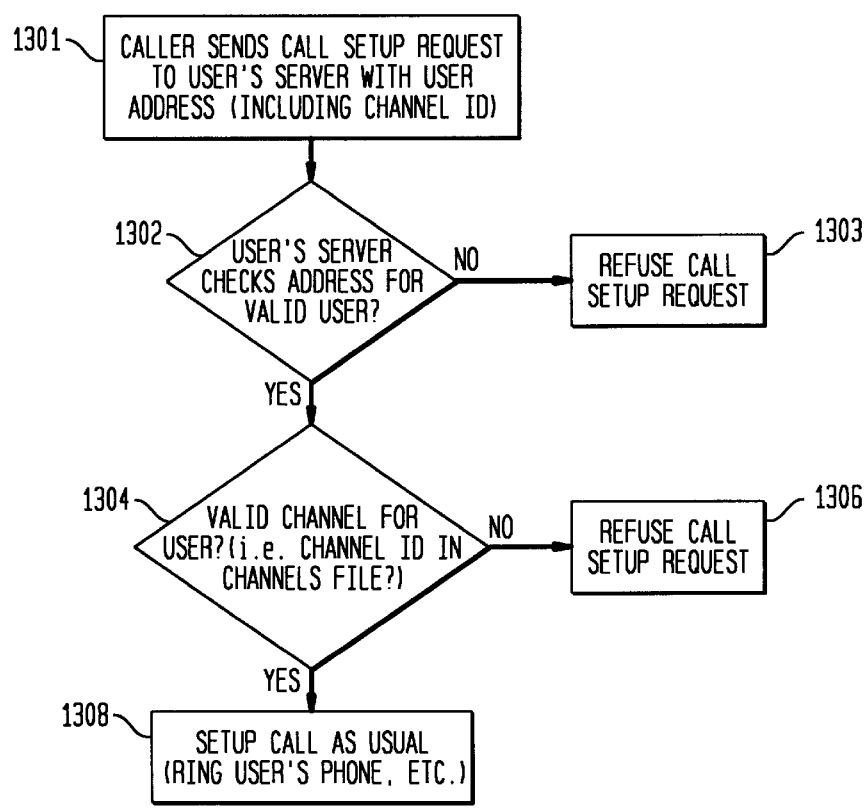
FIG. 13 is a flow diagram illustrating the process for receiving a call on the system shown in FIG. 12.

Referring now to FIG. 13 the process for receiving a packet telephone call, for example from third party 1220 will now be described. In this example, it is assumed that the call is directed to user 1210, but an indication of how the call would proceed to the telephone 1218 is also indicated parenthetically. In step 1301, the caller (third party 1220) transmits a call set-up request including the user's address to the recipients/user's telephony server 1206 (or 1206a). This will include the user's channel ID if the user uses channelized addresses for incoming calls.

In step 1302, the user's telephony server 1206 (or 1206a) checks the address sent by the third party 1220 to determine if the user it designates is an authorized user 1210 (or 1218) for that system. If in step 1302 the server determines that the address does not designate an authorized user 1210 (or 1218), the system refuses the call setup request in step 1303. If it is determined in step 1302 that the user is an authorized user, then the process proceeds to step 1304.

In step 1304, the server 1206 (or 1206a) checks the channels file 1216 (or 1216a) and determines whether or not the channel ID provided by the third party 1220 is open. If the channel ID is not open, in step 1306, the system will refuse the call set-up request from the third party. If, in step 1304 it is determined that the channel provided by the third party is valid and found as an open channel in the channels file 1216 (or 1216*a*) the server 1206 (or 1206*a*) will, in step 1308 set-up the call in a conventional manner. This will include in the embodiment shown by 1204 sending the information to the voice input/output interface 1208 so that the call may be listened to and responded to by the user 1210. In the embodiment shown by 1217, this will include ringing the user's telephone 1218 through the PCA 1214*a* so that the user can pick up the telephone and communicate with the third party 1220.

For the process illustrated by FIG. 13, the packet telephony server 1206 (or 1206*a*) is modified from those known in the art in that it separates the channel ID from the address and checks the channels file to see if the channel ID is in the channels file 1216 (or 1216*a*). This check is done in addition to any other checks or processing that the server 1206 (or 1206*a*) may also perform as is known in the art.

Figure 14:
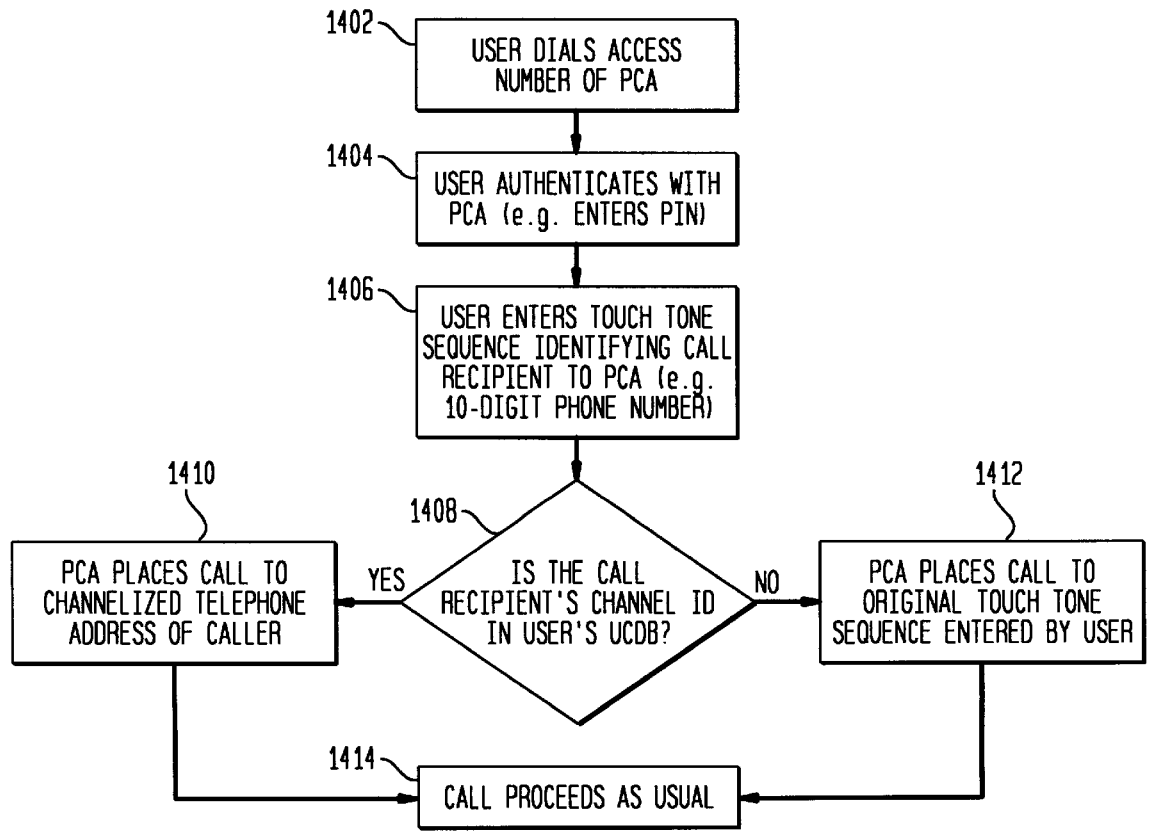
FIG. 14 is a flow diagram illustrating the process for placing a call on the system shown in FIG. 12.

Referring now to FIG. 14, the process for placing a packet telephone call from a standard telephone set 1218 (the embodiment shown by 1217) will now be described. First, in step 1402, the user dials on the telephone 1218 the access number of the PCA 1214*a*. Next, in step 1404, the user demonstrates that he is authorized to access the PCA 1214*a*. This may be accomplished in a preferred embodiment, for example, by entering a "PIN" (personal identification number) number. In step 1406, the user enters a touch tone sequence to identify the party to be called (or call recipient), for example a third party 1220. This entry is accomplished using the standard touch tone keypad on the telephone 1218 and is entered into the PCA 1214*a*. This may be accomplished using a standard 10-digit telephone number in one embodiment. In other embodiments, other addresses may be used.

In step 1408, the PCA 1214*a* determines whether the user/caller 1218 has a channel ID for the party to be called (or call recipient) in the user's/caller's UCDB. If there is an entry in the UCDB, in step 1410, the PCA 1214*a* places the call to a channelized telephone address of the caller. If, in step 1408, it is determined that the caller does not have a channel ID for the call recipient in the UCDB then, in step 1412, the PCA 1214*a* places the call to the original telephone number sequence entered by the user. Whether the PCA placed the call to a channelized telephone address in step 1410 or without a channelized telephone address in step 1412, the call then proceeds in a conventional manner in step 1414. That is, the call is sent to the recipient over the network and, if the recipient uses channelized addresses, the process described with respect to FIG. 13 occurs. If the call recipient does not use channelized addresses, the call proceeds as is known in the art.

The process for sending a telephone call for the embodiment shown by 1204 is similar to that described for the embodiment shown by 1217 with reference to FIG. 14, except that steps 1402 and 1404 are not necessary and therefore omitted. Step 1406 is replaced by the user 1210 initiating the call by clicking "place call" in the administrative interface as described above.

It is understood that while a "PCA" has been described for the embodiments shown in FIGS. 12, 13 and 14, this PCA is different than the actual PCA used by the embodiments described earlier. The PCA of FIGS. 12, 13 and 14 is similar in overall function to the PCA's of the other embodiments, but is configured to accommodate Packet Telephony. In another embodiment, the PCA may be configured to process both Packet Telephony calls and e-mail messages.

It is understood that the users sending packet telephone calls may use the standard ten digit telephone numbers, or longer numbers for overseas calls. In addition, the users may also use other types of addresses for sending calls to call recipients. These other types of addresses may comprise digits, letters, or any other combination thereof, including other types of characters. These other addresses may be longer (or shorter) than standard telephone numbers.

It is further understood that channelized addresses and PCAs according to the invention have many practical uses. For example, one may participate in a public forum, such as a mailing list or newsgroup, without giving away access information. At the time a user subscribes to a list, the user may send a public channel address to the list maintainer. All messages sent to the list (and therefore to the user) may be delivered on this public channel. To send a message to the list, however, the user sends the message from a "send-only" channel using a send-only address in the "from" header. Anyone wishing to reply must send the reply message to the list maintainer and thus to the entire list. If the user wishes to allow private replies, the user may allocate a limited-lifetime public channel and use it as the return address, perhaps explicitly indicating when it will be deactivated. People wishing to respond to a message sent to the list can do so privately for a short while, but firms collecting interest-based mailing lists will be left with closed channels after the timeout period. The user may always choose to "upgrade" a correspondent to a permanent channel once contact is made.

Channelized addresses and list servers on a network may be used together to implement private mailing lists. This would allow groups to confer without requiring that they all have direct channels to each other, while prohibiting outsiders from sending messages to the group. This may be implemented by establishing a list server with an unguessable (channelized) address known only to list members. List members need not have direct channels to each other. Therefore, this application may be useful, for example, when a single buyer needs to have a group discussion, such as an auction, with vendors who are mutually adversarial.

Channelized e-mail according to the invention may also enhance the effectiveness of e-mail filters and agents. This may be accomplished by providing a reliable categorization based on which classes of correspondents know which channels. For example, when filling out registration forms for products, one may use a particular public channel. Then, the filter could be instructed to classify all traffic on that channel as lower priority than traffic on more personal (or private) channels.

In a typical setting, the user's mail server and its local network should preferably not be systematically eavesdropped by an adversary. This is most likely the case, for example, when the server is run by a reputable commercial on-line service. In that case, the server, the filesystem containing the user's channels file, and at least part of the network will typically reside in locked or secure rooms and other hard-to-access places. System administration will presumably be competent and careful. Finally, the inherent risks and costs of breaking into such a secure server likely would not be justified by stealing easily changeable access channels. But, channelized addresses according to the invention do not require that the entire network be impervious to eavesdropping. For example, it is plausible that one or more correspondents of a user may be "eavesdroppable." In this case, an adversary may gain access to the user by examining the messages of the legitimate correspondent. Moreover, since it is easy to forge Internet mail messages, it may be difficult to identify (at least initially) where the unauthorized messages are originating from or which correspondent "leaked" the channel ID. However, by systematically assigning correspondents to unique channels, the user can easily locate the leak. At that point, the user can deal with the correspondent directly to establish some means of authentication. For example, in an alternative embodiment, the legitimate correspondent could be assigned a channel and then a filter agent could accept messages on that channel only if the correspondent's digital signature can be verified.

Channelized addresses according to the invention may also be used without a PCA, but a PCA is preferred. The PCA eliminates the need to remember what channel to use as a return address for a particular correspondent. Also, when sending messages to multiple recipients, security is breached if one simply includes everyone's channelized addresses since it is unlikely all readers will be authorized for all of the other recipient's channels. For example, suppose one sends a message to a mailing list and cc's a friend's private channel address (because the friend does not read the list). The "Cc" will be visible to all list readers so they will all gain unauthorized access to the friend. The PCA eliminates all of these potential problems.

The PCA may also solve problems relating to replying to or forwarding messages. People frequently include a received message within a reply to, or forward of, the received message. If the original message contains channel IDs for recipients, then the user must remember (as a courtesy) to edit them out of the copied original. If the user has a PCA, the PCA will automatically take care of this.

It is understood that channelized addresses according to the invention may be used without a PCA. While a correspondent who does not use a PCA must directly use the user's channelized address which may be harder to remember, many mail clients provide for on-line address books or user-defined aliases, which would be used when a PCA is unavailable to simply address channelized e-mail. Using these address books or aliases will not solve all of the problems eliminated by the PCA, for example, when sending a "Cc" and reply, the channel ID may be "leaked" when the correspondent sends a multi-recipient message. In addition, automatic channel switching as described with reference to FIG. 9 is not provided for if the correspondent does not have a PCA. In this case, the user's PCA may be configured to automatically generate notification to each desired correspondent regarding the changing channel. Each correspondent would then have to update her address book.

It is useful to notice when correspondents send messages on channels they are not authorized for so that "leaks" can be isolated when they become a problem. However, the problem may take a while to appear (as more and more junk traffic builds up on a channel), while the original leaks will be long forgotten. In a preferred embodiment, the PCA checks each incoming message to determine whether the sender is authorized to send messages on the channel the message arrived on. Specifically, messages to private channels are checked to see whether the sender is a "member" of the channel. If not, the user is notified (preferably only once for a given user and channel) and the event is logged in the UCDB. This is not done for public channels because one expects previously unknown correspondents to send messages on public channels.

Channelized addresses according to the invention may also resolve a possible dilemma caused by directories of e-mail addresses. An approach based on not telling everyone how to reach the user conflicts with the idea of directories, which tells everyone how to reach the user. Channelized addresses may actually help resolve this tension because one might be more willing to publish an easily changeable address than a permanent address. If traffic on a particular channel becomes voluminous (or "noisy"), the user may deactivate the published channel and (if desired) publish a replacement channel.

In another embodiment, channelized addresses according to the invention may be used in combination with cryptographic authentication. Cryptographically authenticated messages may be received on a public channel as an alternative to private channels for those users who wish to use cryptography. In addition, in an alternative embodiment, the user could create an "authenticated channel". Here, a filter rejects messages that are not digitally signed by an expected correspondent. An authenticated channel could even have a well-known channel ID such as "1 AUTHENTIC" since unauthenticated messages are discarded unseen.

In the presently preferred embodiment, each correspondent is preferably allowed at most one channel, although it is understood that multiple channels may be assigned to a single correspondent. While it may seem desirable to allow multiple channels per correspondent (for example, for different purposes), no security is gained by a single individual knowing two or more access channels for a correspondent. Instead, the logical separation of traffic from a single user may be implemented in an alternative embodiment using existing e-mail filtering techniques known in the art. In such combined architectures, an extended UCDB may accommodate the needs of both channels and e-mail filters by allowing multiple channels per correspondent. In this configuration, one channel should preferably be designated as the default for use when rewriting header and envelope information in outgoing messages.

In the presently preferred embodiment, the system rewrites the header information and (when applicable) the SMTP envelope information by adding/deleting channelized addresses. In an alternative embodiment, the system may simply rewrite the envelope information with the channelized address and leave the header information alone.

It is understood that rewriting the header information in addition to the envelope information may be preferable due to the ability to operate with non-channel using correspondents and non-SMTP mailers as well as user convenience. A nonchannel using correspondent expects a valid return address (in order to be able to use the client's reply command, for example) to appear in the "From" field (part of the header) of a message. Thus, if a PCA does not rewrite the header, the non-channel using correspondent may not receive the channel ID. Also, the non-channel using correspondent will provide a channelized address in the "To" field (part of the header) when originating a message. If the PCA is not configured to remove this channelized address from the header, security problems may result if the recipient forwards or replies to the message without manually removing the non-channel using correspondent's address from the message.

If the PCA does not rewrite the header but only the envelope, some non-SMTP mail systems may not be able to process the message if these systems do not separate header information from envelope information. For these mail systems to process the message, the correct addresses must appear in the header.

In the preferred embodiment, one convenient way for a user of channelized addresses and a PCA to enter a new correspondent's channelized address into the UCDB for the first time is to type or otherwise input the full address into the "To" field of the outgoing message. The PCA can then record it as it passes through untouched. Subsequent messages may be rewritten by the PCA so that the user need no longer type in the channel ID part of the address. If the PCA did not rewrite header information, this convenience may be limited or eliminated. In addition, a PCA can infer a correspondent's channelized address when one is not known (in the UCDB) by reading it in the "From" field of a received message. If header information was not processed by the PCA, this convenience may also be limited or eliminated.

In an alternative embodiment, the channel ID may be placed in some other field of the message header. It is understood that this alternative is less preferable when a user wishes to use mailing lists because each contributor to the list may have to include channel IDs for all recipients. This may be a difficult task. In this alternative embodiment, a sophisticated list manager may be used to store the appropriate channel ID for each address subscribed and make a tailored copy of each message for each recipient. Currently, no existing list servers are known that operate in this manner. On the other hand, putting the channel ID in the address allows the channelized addresses to operate together with existing list servers.

As compared to prior art methods, channelized addresses or channels according to the invention offer many advantages. For example, as compared to "kill files," it is possible with channels to grant access individually or as a group to any set of individuals, while denying access to others. Forgery does not help an adversary evade the channel mechanism of the present invention. As compared to filters, any message that arrives must have the specific channel ID. No detailed searching of the content of the actual message is necessary.

Channels also allow the user to absolutely "shut off" the flow of messages from an adversary by closing all channels known to that adversary. To gain unauthorized access, the adversary must invest significant effort, risk, or money in eavesdropping or social engineering, while access can easily be prevented once again after receipt of one unwanted message.

It is to be understood that the above description is only of the preferred embodiments of the invention. Numerous other arrangements may be derived by one skilled in the art, without departing from the spirit and scope of the invention. The invention is thus limited only as defined in the accompanying claims.

I claim:

1. A method for sending a message from a sender to a recipient in a network, comprising the step of:

using an address to send the message from the sender to the recipient wherein the address comprises a common address portion that indicates the identity of the recipient in the network and a channel identifier portion for verifying that the message is authorized for delivery to the recipient.

2. The method of claim 1, wherein the message is an e-mail message.

3. The method of claim 1, wherein the message is a packet telephone call.

4. The method of claim 1, wherein the channel identifier portion comprises a substantially unguessable portion.

5. The method of claim 4, wherein the substantially unguessable portion is generated using random number generation.

6. The method of claim 4, wherein the substantially unguessable portion is generated using pseudorandom number generation.

7. The method of claim 4, wherein the substantially unguessable portion is generated by a user selecting the unguessable portion.

8. The method of claim 1, wherein establishing the channel identifier portion is controlled by the recipient.

9. The method of claim 1, wherein the channel identifier portion comprises a channel class indicator indicative of a class of message to be treated by the recipient in a predetermined manner.

10. The method of claim 9, wherein the channel identifier portion also comprises a substantially unguessable portion.

11. An improved address of the type having a hierarchy of names including a lowest-level name at the lowest level of the hierarchy, the improved address comprising a channel identifier part of the lowest-level name that includes at least a substantially unguessable channel identifier.

12. The improved address of claim 11, wherein the improved address is an e-mail address and the lowest-level name is a user name.

13. The improved address of claim 11, wherein the improved address is a telephone number for packet telephony.

14. The improved address of claim 11, wherein the channel identifier part further includes a channel class indicator which indicates at least how a recipient is to treat a received message which has the improved address.

15. The improved address of claim 14, wherein the channel class indicator indicates classes of messages that may be any one of public, private and send-only.

16. A system for authenticating a received message from a network, the message having an address attached to it, comprising:

a mail server for receiving and authenticating the message; and a file available to the mail server for determining whether the message is an authorized message, wherein the determination is based upon a substantially unguessable portion of the address attached to the message.

17. The system of claim 16, wherein the message is an e-mail message.

18. The system of claim 16, wherein the message is a packet telephone call.

19. The system of claim 16, wherein establishing the substantially unguessable portion is controlled by a recipient of the message.

20. The system of claim 16, wherein the substantially unguessable portion is generated using random number generation.

21. The system of claim 16, wherein the substantially unguessable portion is generated using pseudorandom number generation.

22. The system of claim 16, wherein the substantially unguessable portion is generated by a user selecting the substantially unguessable portion.

23. The system of claim 16, wherein the substantially unguessable portion comprises a channel class indicator indicative of a class of message to be treated by the recipient in a predetermined manner.

24. The system of claim 16, further comprising a personal channel agent.

25. The system of claim 24, wherein the personal channel agent automatically removes the substantially unguessable portion from the message before delivering the message to a recipient.

26. The system of claim 24, wherein the personal channel agent accesses a database containing at least one or more substantially unguessable portions corresponding to one or more correspondents.

27. The system of claim 24, further comprising a web browser for administering the personal channel agent.

28. The system of claim 24, further comprising an administrative interface for administering the personal channel agent.

29. The system of claim 24, further comprising a user machine for displaying the message on a screen.

30. The system of claim 29, wherein the user machine is a personal computer.

31. The system of claim 29, wherein the user machine comprises a mail client for receiving the message.

32. The system of claim 16, further comprising means for changing the substantially unguessable portion so that a new substantially unguessable portion is established for determining whether the message is an authorized message.

33. The system of claim 32, wherein the means for changing the substantially unguessable portion is a personal channel agent.

34. The system of claim 33, wherein a key is required for changing the substantially unguessable portion.

35. The system of claim 34, wherein the key is provided by a recipient of the message.

36. The system of claim 33, wherein a first key and a second key are required to change the substantially unguessable portion.

37. The system of claim 36, wherein the first key is provided by a sender of the message and the second key is provided by a recipient of the message.

38. A system for sending a message on a network to a recipient, comprising:
a personal channel agent for automatically including a substantially unguessable portion in a recipient's address so that the recipient can determine whether the message is an authorized message that the recipient will receive.

39. The system of claim 38, wherein the message is an e-mail message.

40. The system of claim 38, wherein the message is a packet telephone call.

41. The system of claim 38, wherein establishing the substantially unguessable portion is controlled by the recipient.

42. The system of claim 41, wherein the substantially unguessable portion is generated by the recipient's personal channel agent using random number generation.

43. The system of claim 41, wherein the substantially unguessable portion is generated by the recipient's personal channel agent using pseudorandom number generation.

44. The system of claim 41, wherein the substantially unguessable portion is generated by the recipient selecting the substantially unguessable portion.

45. The system of claim 38, wherein the substantially unguessable portion comprises a channel class indicator indicative of a class of message to be treated by the recipient in a predetermined manner.

46. The system of claim 38, wherein the system further comprises a mail server.

47. The system of claim 38, wherein the personal channel agent includes the substantially unguessable portion by referring to a database.

48. The system of claim 47, wherein the database contains at least one or more substantially unguessable portions corresponding to one or more correspondents.

49. The system of claim 38, wherein the personal channel agent is administered using a web browser.

50. The system of claim 38, wherein an administrative interface is provided for administering the personal channel agent.

51. The system of claim 38, further comprising a user machine for inputting the message.

52. The system of claim 51, wherein the user machine is a personal computer.

53. The system of claim 51, wherein the user machine comprises a mail client for transmitting the message to the personal channel agent.

54. The system of claim 53, further comprising a mail server for transmitting the message from the personal channel agent to the network.

55. A method of sending and receiving messages from one or more first correspondents to a second correspondent comprising the steps performed in a message transmission apparatus of:
the second correspondent forming a plurality of substantially unguessable extended addresses for messages sent from the one or more first correspondents to the second correspondent; and
providing a received message to the second correspondent only if an address to the second correspondent associated with the received message matches one of the plurality of extended addresses.

56. The method of claim 55, further comprising the step of automatically adding an extended address as a return address of a first message when the second correspondent sends the first message to a first correspondent.

57. The method of claim 56, further comprising the step of the first correspondent storing the extended address from the first message.

58. The method of claim 57, further comprising the step of the first correspondent automatically adding the extended address from the first message to the address to the second correspondent.

59. The method of claim 55 further comprising the step of a first correspondent automatically adding an extended address to the address to the second correspondent.

60. The method of claim 55, further comprising the step of forwarding the received message to the second correspondent.

61. The method of claim 55, further comprising the step of automatically removing an extended portion of one of the plurality of substantially unguessable extended addresses.

62. The method of claim 55, further comprising the step of automatically removing any extended portions of any addresses.

63. The method of claim 55, wherein the extended address comprises an indication of a class of treatment for the messages.

64. The method of claim 55, wherein the messages are e-mail messages.

65. The method of claim 55, wherein the messages are telephone messages.

66. The method of claim 55 further comprising the step of associating each of one or more of the extended addresses with one or more destination addresses for the one or more first correspondents.

67. The method of claim 66, wherein a single extended address is associated with a single first correspondent.

68. The method of claim 67, further comprising the step of changing the single extended address to a new extended address.

* * * * *

(12) EX PARTE REEXAMINATION CERTIFICATE (7331st)
United States Patent
Hall

(10) Number: US 5,930,479 C1
(45) Certificate Issued: Jan. 26, 2010

(54) COMMUNICATIONS ADDRESSING SYSTEM

(75) Inventor: Robert J. Hall, Berkeley Heights, NJ (US)

(73) Assignee: Winstate Investments Limited, LLC

Reexamination Request:
   No. 90/008,158, Sep. 14, 2006

Reexamination Certificate for:
   Patent No.: 5,930,479
   Issued: Jul. 27, 1999
   Appl. No.: 08/734,285
   Filed: Oct. 21, 1996

(51) Int. Cl.
   H04L 12/58 (2006.01)
   H04L 29/06 (2006.01)
   H04M 3/53 (2006.01)
   H04M 3/50 (2006.01)
   H04M 7/12 (2006.01)

(52) U.S. Cl. .................................... 709/238; 709/206
(58) Field of Classification Search .................. None
   See application file for complete search history.

(56) References Cited

U.S. PATENT DOCUMENTS

| | | |
|---|---|---|
| 5,555,346 A | 9/1996 | Gross et al. |
| 5,627,764 A | 5/1997 | Schutzman et al. |
| 5,717,860 A | 2/1998 | Graber et al. |
| 5,742,771 A | 4/1998 | Fontaine |
| 5,822,526 A | 10/1998 | Waskiewicz |
| 5,930,479 A | 7/1999 | Hall |
| 5,999,967 A | 12/1999 | Sundsted |
| 6,185,551 B1 | 2/2001 | Birrell et al. |
| 6,266,692 B1 | 7/2001 | Greenstein |
| 6,546,416 B1 | 4/2003 | Kirsch |
| 6,708,205 B2 | 3/2004 | Sheldon et al. |
| 6,725,269 B1 | 4/2004 | Megiddo |
| 6,760,752 B1 | 7/2004 | Liu et al. |
| 7,054,906 B2 | 5/2006 | Levosky |
| 2002/0023135 A1 | 2/2002 | Shuster |
| 2002/0024536 A1 | 2/2002 | Kahan et al. |

OTHER PUBLICATIONS

"A Simple Unpredictable Pseudo–Random Number Generator", Blum et al, SIAM Journal on Computing, vol. 15, No. 2, pp. 364–383, May 1986.*
Journal of Computing, vol. 15 No. 2. p. 364 (May 1986).
Borenstein, et al., Power, ease of use and cooperative work in a practical multimedia message system, Int'l J. Man–Machine Studies 34(1) 229–259 (1991).
Dusse, S/MIME Message Specification, RSA Data Security Inc. (Sep. 1996).
Dusse, et al., S/MIME: Anatory of a Secure E–Mail Standard, RSA Data Security Inc., printed from http://www.e-ma.org/html/pubs/mmv24/s–mine.htm on Oct. 18, 1996, original publication date unknown.
Myers, et al., Request for Comments 1725, Post Office Protocol—Version 3. University of California at Berkeley. Http://cobweb.berkeley. Edu/web/Hypertext/popper/rfc1725.txt (Nov. 1994).
RSA Data Security, Inc.: S/MIME Implementation Guide, Interoperability Profile, Version 1, S/MIME Editor, ftp:ftp.rsa.com/pub/S–MIME/smimeimp.txt (Aug. 1995).
RSA Data Security, Inc., S/MIMECentral. Retrieved from the web, http://www.rsa.com/rsa/S–MIME on Oct. 18, 1996 original publication date unknown.
University of California at Berkeley: popper–1.831 beta README file, http://avalon.phys.hokudai.ac.jp/pub/hp...–1.831beta/popper–1.831beta.README.html (1991).
Schiller, MIT distributino site for PGB, http://web.mit.edu/network/pgp.html (Sep. 4, 1996).

(Continued)

Primary Examiner—Fred Ferris

(57) ABSTRACT

A system and method is provided for sending and receiving authorized messages from a sender to a recipient in a network. The method and system makes use of a channelized address to send the message from the sender to the recipient. The channelized address comprises a common address portion that indicates the identity of the recipient in the network and a channel identifier portion for verifying that the message is authorized for delivery to the recipient.

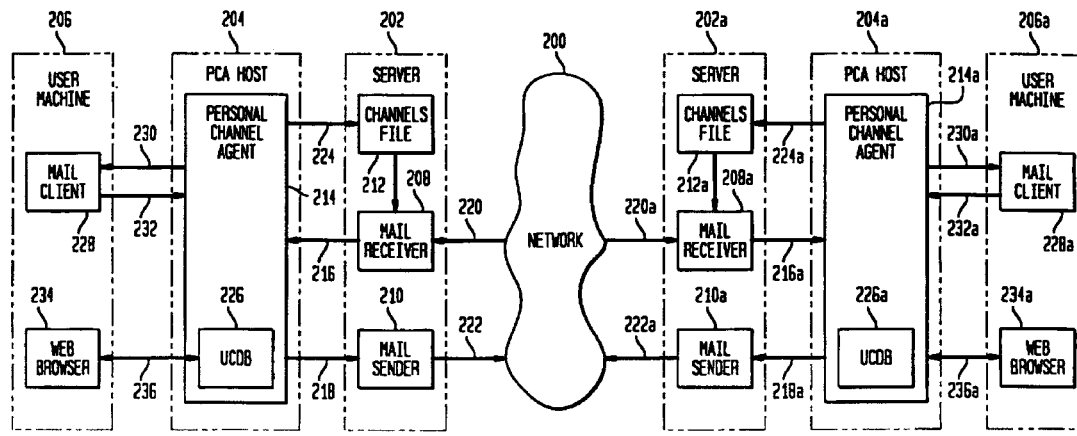

OTHER PUBLICATIONS

University of California at Berkeley: popper Maintenance Procedures, http://ptolemy.eecs.berkeley.edu/cgi-bin/man?popper (Aug. 1990).

Kent, RFC 1422, "Privacy Enhancement for Internet Electronic Mall: Part II: Certificate-Based Key Management," Internet Engineering Task Force, Feb. 1, 1993, pp. 1–32.

"Webmail User's Manual." (Arvhived May 19, 2000) Retrieved from archive on Jun. 1, 2007 Archived at <http://web.archive.org/web/20001211232500/netwinsite.com/webmail_user.htm>. 11 pages.

"WebMail: Web Based Mail, Installation and Management Guide." (Archive May 19, 2000) Retrieved from archived on Aug. 1, 2007, archived at <http://web.archive.org/web/20001211223200/netwinsite.com/webmail/webmail.htm>, 27 pages.

"WebIMAP/WebMail Gallery!!" (Archived May 19, 2000). Retrieved from archive on Jun. 14, 2007 Archived at <http://web.archived.org/web/20000823185525/netwinsite.com/webimap/gallery.htm>, 4 pages.

"Frames (HTML 4.01 Standard, Ch. 16)" Archived May 20, 2000, Retrieved from archive on Jun. 1, 2007. Located at <http://www.w3.org/TR/htm1401/present/frames.html> and archived at <http://web.archive.org/web/20000816154950/www.w3.org/TR/html4/present/frames.html> 13 pages.

Provisional Application No. 60/269284, "Method for and System of Creating a Personal Electronic Messaging Domain" filed on Feb. 15, 2001 for Valentine Sheldon, incorporated by reference in U.S. Appl. No. 6708205.

Borenstein, Nathaniel S. et al., (1991) "Power, Ease of Use and Cooperative Work in a Practical Multimedia Message System," 34 *Int. J. Man-Machine Studies* 229-259, 31 pages (Exhibit A).

Costales, Bryan and Allman, Eric , et al., *Sendmail*, pp. 1–40, 269–286 (1$^{st}$ Ed. 1993) (with minor corrections through Feb. 1994), 41 pages (Exhibit F).

Crocker, David H. (Aug. 13, 1982) "Standard for the Format of ARPA Internet Text Messages," Department of Electrical Engineering, University of Delaware. Retrieved from the Internet: URL <http://www.ietf.org/rfc/rfc0822.txt?number=822>, retrived on May 15, 2006, 46 pages (Exhibit M).

Eastlake, D. III, et al., "The Etymology of Foo," (Apr. 1, 2001) available at http://www.ietf.org/rfc/rfc3092.txt and retrieved on May 8, 2006, 13 pages (Exhibit I).

"Flames.Help" Copyright 1992 by Carnegie Mellon University and IBM, retrieved from the Internet: URL <http://asg.web.cmu.edu/sieve/flames.html>, retrieved on May 15, 2006, 8 pages (Exhibit B).

"Flames.Help" Copyright 1992 by Carnegie Mellon University and IBM, retrieved from the Internet: URL <http://www.cs.cmu.edu/People/AUIS/ftp/src/ams/flames/flames.help>, retrieved on May 12, 2006, modified no later than May 26, 1994, 10 pages (Exhibit B1). [NOTE: This document corresponds to reference 7 (Exhibit B) above, but reflects formatting for display in the Andrews Message System ("AMS"). Because this document is difficult to read in its native AMS format without access to an AMS file reader, Requester submits both the native version and the more readable HTML version of reference 7, above).].

Mendelson, Edward et al. (Oct. 8, 1996) "E-Mail: Building the Perfect In-Box," *PC Magazine*, pp. 183–204, 12 pages (Exhibit L).

Rosenberg, Jonathan et al., (1987) "An Overview of the Andrew Message System: A Portable, Distributed System for Multi-media Electronic Communication," *Proceedings of the ACM Workshop on Frontiers in Computer Communications Technology*, 99–108 (ACM Press), 10 pages (Exhibit K).

Business Wire (Jul. 1, 1996) "www.hotmail.com: HoTMaiL Provides Web-Based Free Email to the World on Independence Day," *Business Wire, Inc.*, Distribution to Business Editors and Computer Writers, 2 pages (Exhibit H).

"Flames Programmers Guide" Copyright 1992 by Carnegie Mellon University and IBM, 105 pages (Exhibit C).

"Flames Programmers Guide" Copyright 1992 by Carnegie Mellon University and IBM, retrieved from the Internet: URL <http://www.cs.cmu.edu/People/AUIS/ftp/src/ams/flames/flames.pgr>, retrieved on Feb. 28, 2006, modified no later than May 26, 1994, 88 pages (Exhibit C1). [NOTE: This document corresponds to reference 12 (Exhibit C) above, but reflects formatting for display in the Andrews Message System ("AMS"). Because this document is difficult to read in its native AMS format without access to an AMS file reader, Requester submits both the native AMS version and the more readable version of reference 12 above).].

Business Wire, "E-mail Security Becomes a Reality on the World Wide Web—Software.com Inc. Announces First Web Administered Server-Based E-mail Product with Unprecedented Ease of Use, Security Innovation," *Business Wire, Inc.*, Distribution to Business Editors & High-Tech Industry Writers (Oct. 30, 1995), 2 pages (Exhibit N).

Qmail Distribution 0.72 (portions) obtained from qmail-0.72.shar shell archive, last modified on Feb. 12, 1996 and retrieved from the Internet: URL <http://ftp4..de.freesbie.org/pub/misc/qmail/> [portions referenced are "index" (4 pages); "blurb" (1 page); "qmail-alias(8)" (3 pages); "qmail-header(5)" (3 pages); "qmail-inject(8)" (2 pages)], 13 pages (Exhibit E).

Allman, Eric. (Sep. 15, 1995) "New Sendmail Configuration Files." 29 pages.

Borenstein, Nathaniel S. et al., (1991) "Power, ease of use and cooperative work in a practical multimedia message system." *Int. J. Man-Medicine Studies*, 34:229–259.

Crocker, David H. (Aug. 31, 1982) "Standard For The Format Of ARPA Internet Text Messages." Department of Electrical Engineering, Univeristy of Delaware. Retrieved from the Internet: URL <http://www.ieft.org/rfc/rfc0822.txt?number=822>, retrieved on May 15, 2006, 46 pages.

Eastlake, D., III et al. (Apr. 1, 2001) "Etymology of 'Foo.'" Retrieved from the Internet: URL <http://www.ietf.org/rfc/rfc3092.txt>, retrieved on May 8, 2006, 13 pages.

Glickstein, Bob et al. (1992) "FLAMES: Filtering Language for the Andrew Message System,." Carnegie Mellon University and IBM. Retrieved from the Internet: URL <http://www.cs.cmu.edu/People/AUIS/ftp/src/ams/flames/flames.help> retrieved on May 12, 2006, (10 pages).

Glickstein, Bob et al. (1992) "FLAMES: Filtering Language for the Andrew Message System,." Carnegie Mellon University and IBM. Retrieved from the Internet: URL <http://asg.web.cmu.edu/sieve/flames.html> retrieved on May 15, 2006, (8 pages).

Mendelson, Edward et al. (Oct. 8, 1996) "E-Mail: Building The Perfect In-Box." *PC Magazine*, pp. 183–204.

Rosenberg, Jonathon et al., "An Overview of the Andrew Message System: A Portable, Distributed System For Multi–media Electronic Communication." *Proceedings of the ACM Workshop on Frontiers in Computer Communications Technology*, 99–108 (ACM Press 1987.).

Business Wire (Oct. 30, 1995) "E–mail security becomes a reality on the World Wide Web—Software.com Inc. announces first Web administered server–based–e–mail product with unprecendented ease of use, security innovation." *Business Wire, Inc.*, Distribution to Business Editors & High–Tech Industry Writers, (2 pages).

Business Wire (Jul. 1, 1996) "www.hotmail.com; HoTMaiL Provides Web–Based Free Email To The World On Independence Day." *Business Wire Inc.* Distribution to Business Editors and Computer Writers, (2 pages).

"Flames: Filtering Language for the Andrew Message System." Carnegie Mellon University and IBM, 1992, (105 pages).

Index of/People/AUIS/ftp/src/ams/flames, retrieved from the internet: URL <http://www.cs.cmu.edu/People/AUIS/ftp/src/ams/flames/> retrieved on Feb. 28, 2006, (1 page).

Portions of qmail–0.72.shar shell archive (Mar. 26, 2006), printed on Friday, Apr. 21, 2006; available at http://ftp4.de.freesbie.org/pub/misc/qmail/ (index (4 pages); "blurb" (1 page); "qmail–alias(8)" (3 pages); "qmail–header(5)" (3 pages); "qmail–inject(8)" (2 pages).

Bryan Costales & Eric Allman, et al., *Sendmail* ($1^{st}$ Ed. 1993) (with minor corrections through Feb. 1994, pp. 1–40, and 269–286).

Josy W. Ingersoll, Elena C. Norman, Karen L. Pascale (Young Conaway Stargatt & Taylor, LLP) and Paul K. Vickrey, Douglas M. Hall, and Frederick C. Laney (Niro, Scavone, Haller & Niro): Complaint For Patent Infringement, Dated Feb. 21, 2006, titled *Zoetics, Inc. and Zoemail, LLC,* Plaintiffs v. *Yahoo! Inc.* Defendant, (4 pages).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4, 7, 8, 11, 12, 16, 17, 19, 22, 24, 26–35, 38, 39, 49, 50, 55–60, 64,66 and 67 is confirmed.

Claims 1 and 2 are cancelled.

Claims 3, 5, 6, 9, 10, 13–15, 18, 20, 21, 23, 25, 36, 37, 40–48, 51–54, 61–63, 65 and 68 were not reexamined.

\* \* \* \* \*